(12) United States Patent
Sawazaki et al.

(10) Patent No.: US 9,317,205 B2
(45) Date of Patent: Apr. 19, 2016

(54) INFORMATION PROCESSING SYSTEM AND CONTROL METHOD THEREOF

(75) Inventors: Junya Sawazaki, Tokyo (JP); Naoki Ikawa, Tokyo (JP); Kei Takeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 14/358,616

(22) PCT Filed: Mar. 16, 2012

(86) PCT No.: PCT/JP2012/056922
§ 371 (c)(1),
(2), (4) Date: May 15, 2014

(87) PCT Pub. No.: WO2013/136520
PCT Pub. Date: Sep. 19, 2013

(65) Prior Publication Data
US 2014/0331084 A1 Nov. 6, 2014

(51) Int. Cl.
G06F 11/00 (2006.01)
G06F 3/06 (2006.01)
G06F 17/30 (2006.01)
G06F 11/14 (2006.01)
G06F 11/20 (2006.01)

(52) U.S. Cl.
CPC .............. *G06F 3/061* (2013.01); *G06F 3/0631* (2013.01); *G06F 3/0689* (2013.01); *G06F 11/1402* (2013.01); *G06F 11/1412* (2013.01); *G06F 11/2058* (2013.01); *G06F 17/30911* (2013.01); *G06F 2201/80* (2013.01); *G06F 2201/845* (2013.01)

(58) Field of Classification Search
USPC ....................................................... 714/6.22
See application file for complete search history.

(56) References Cited

U.S. PATENT DOCUMENTS

| 6,289,359 | B1 | 9/2001 | Ando et al. |
| 8,543,862 | B2* | 9/2013 | Dilman .................... 707/690 |
| 2006/0053334 | A1* | 3/2006 | Ingen ............... G06F 11/1466 714/2 |
| 2006/0085673 | A1* | 4/2006 | Nomoto .............. G06F 3/0605 714/6.12 |

FOREIGN PATENT DOCUMENTS

JP  11-154155 A  6/1999

OTHER PUBLICATIONS

Chang, Fay, et al.; Bigtable: A Distributed Storage System for Structured Data; Proceedings of the 7th Symposium on Operating Systems Design and Implementation, 2006; pp. 4:1-4:26.
International Search Report on application PCT/JP2012/56922 mailed Jun. 19, 2012; 3 pages.

* cited by examiner

*Primary Examiner* — Sarai Butler
(74) *Attorney, Agent, or Firm* — Foley & Lardner LLP

(57) ABSTRACT

Information processing system for rapidly performing analysis of semistructured data while preserving fault-tolerance of data for a store request acquiring the number which has been stored of the same and data structures set beforehand, refer to data structure management information to determine a data store unit, instructs replica creation of the data with regard to the data stored in the data store unit in which any of the replicas have been stored, transmits an instruction, for performing a data operation, to a data structure operation unit, whereupon a processing unit, in accordance with the content of an analysis request, performs analysis processing by way of either data stored in any of the data storage units after a data structure operation or data which have not been subject to a data structure operation.

15 Claims, 26 Drawing Sheets

COMPUTER DEFINITION FILE 40

POLICY DEFINITION FILE 50

| ITEM | VALUE | |
|---|---|---|
| FILE REDUNDANCY LEVEL | 3 | ~51 |
| RETENTION RATIO OF ORIGINAL FILE AND CONVERTED FILE | 2:1 | ~52 |

ANALYSIS REQUEST SETTING SCREEN 61

QUERY USING CONVERTED FILE ~ 61

```
SELECT SUM((col)+) from *  ~62
SELECT AVG((col)+) from *  ~63
SELECT ((col){1,4}) from *  ~64
...
```
~65
ADD ~66
DELETE ~67

FIG. 4

DATA STRUCTURE MANAGEMENT TABLE 70

|  |  | PROCESSING COMPUTER | | | |
|---|---|---|---|---|---|
|  |  | 71-1 | 71-2 | 71-3 | |
|  |  | 1 | 2 | 3 | ... |
| FILE | 72-A  A | 0  73-A1 | 0  73-A2 | 1  73-A3 | |
| | 72-B  B | 1  73-B1 | 0  73-B2 | 0  73-B3 | |
| | 72-C  C | 0  73-C1 | 1  73-C2 | 0  73-C3 | |
| | ... | | | | |

LEGENDS: 0=RETAIN ORIGINAL FILE
1=RETAIN CONVERTED FILE
-1=NOT RETAINED

FIG. 5

DATA STRUCTURE/STATISTICS INFORMATION MANAGEMENT TABLE 70A ~70A

| FILE | PROCESSING COMPUTER | | | | RETENTION RATIO 74 | REFERENCE NUMBER 75 |
|---|---|---|---|---|---|---|
| | 71-1 / 1 | 71-2 / 2 | 71-3 / 3 | ... | | |
| 72-A / A | 73-A1 / 0 | 73-A2 / 0 | 73-A3 / 1 | | 74-A / 2:1 | 75-A / 2:6 |
| 72-B / B | 73-B1 / 1 | 73-B2 / 0 | 73-B3 / 0 | | 74-B / 2:1 | 75-B / 4:1 |
| 72-C / C | 73-C1 / 0 | 73-C2 / 1 | 73-C3 / 0 | | 74-C / 2:1 | 75-C / 6:2 |
| ... | | | | | | ... |

LEGENDS:  0=RETAIN ORIGINAL FILE
1=RETAIN CONVERTED FILE
-1=NOT RETAINED

FIG. 18

INFORMATION PROCESSING SYSTEM AND CONTROL METHOD THEREOF

TECHNICAL FIELD

The present invention relates to an information processing system and a control method thereof capable of being applied to processing of semi-structured data.

BACKGROUND ART

An amount of data processed by an information processing system has been increased along with a widening field to be processed year by year. Further, types of the data greatly vary from conventional business-use data to actual world information, which is typically a sensor technique. Furthermore, in recent years, it has been vigorously attempted to acquire new knowledge for business and society from log data that has been considered as having less values by analyzing the log data generated in a processing process of the information processing system. A great amount of data including the log data is referred to as "big data" and, as a foundation for realizing great-amount data processing, data processing at high speed for the information processing system is demanded more than ever before.

Roughly two types of methods are provided for speeding up the information processing system. One of them is a method for improving performance of a stand-alone computer referred to as "scale up". Another one is referred to as "scale out" and, by arranging a plurality of computers, the performance of the information processing system is improved. Recently, the performance of the computer by the scale up has been less improved than before, and the performance thereof by the scale out has become a main stream. Furthermore, in distributed processing of a scale-out type, a plurality of computers including commodity hardware are arranged to realize the distributed processing at a moderate cost, and also a distributed processing foundation which a user can conveniently use is provided for the information processing system.

As described above, since it is assumed that the commodity hardware is used, the distributed processing foundation used in recent years realizes a scale-out property of the distributed processing by dispersing and arranging a file to be processed in each computer to perform the distributed processing at a high speed.

Further, to perform the distributed processing foundation at a high speed, a dedicated file system is prepared. Since it is assumed that the commodity hardware is used in the file system, by redundantly retaining the file to be processed in the plurality of computers, fault tolerance of the file can be realized.

Furthermore, since the great-amount data processing has become more popular, compared with the conventional processing, a storage structure of the data has been changing. So far, the data to be processed has been generally stored in a relational database. Such data is referred to as "structured data". When the relational database is used, it is appropriate for the processing for searching and extracting the data. However, a great number of hours and loading works on the database are necessary to perform the search and the extraction.

On the other hand, in the great amount of data processing, since the amount and types of the data have been increased, the conventional relational database cannot solve problems. First, the data that cannot be treated by the conventional structured data, such as images and audio, is going to be a processing target. Such data is difficult to be processed by the conventional relational database. Although such data is structured like the log data, since the great amount and types of data in a file format exists, it is not realistic to load the data into the relational database.

From the above-described problems, in the distributed processing foundation in recent years, the method has become the main stream for performing the distributed processing on the data in an original file format without loading the data to be processed into the relational database. Since structuring the data such as the images and the audio is difficult, they are generally referred to as non-structured data. Further, the data that is structured like the log data but exists as the file format is referred to as semi-structured data. The semi-structured data includes a comma separated values (CSV) file and an eXtended marked-up language (XML) file.

Since the semi-structured data including the CSV file is not structured but stored in the file format, data access to the semi-structured data depends on the data structure of the semi-structured data. A case where a depending relationship causes a problem will be described below according to examples.

An example of the CSV file will be described herein. When the CSV file is sequentially read from a disk, the data on the CSV file is sequentially accessed in a row direction. In a case of the CSV file, one row generally stores information related to a time stamp, a name for discriminating each record, and attribute values of various types as one record. Therefore, when the CSV file is sequentially read, the data for each record can be sequentially read.

On the other hand, when analysis is performed using the information stored in the CSV file, processing is generally, widely performed in which the attribute values of the same type are extracted and the extracted attribute values are added up. In such processing, when the attribute values of the same type are extracted and added up, access in the row direction of the CSV file occurs. Therefore, the CSV file is simply stored in the disk and the access in the row direction of the CSV file becomes random access on the disk and, thus, an access speed in the row direction is slowed down.

As to the problem described above, as a conventional solution method, a method is provided for using columnstore in a format capable of processing the data stored in the database in the row direction, Products using this method includes Google BigTable (trademark) indicated in non-patent literature (NPL) 1. Further, the patent literature disclosing a similar technique includes patent literature (PTL) 1.

In the method using the columnstore, when input data such as the structured data and the semi-structured data is loaded into the information processing system, the input data is stored in the columnstore to be converted into the data having the data structure appropriate for the row direction access. More specifically, the data is stored with the row and the column of the data previously replaced with each other so that the access in the row direction becomes the sequential access.

CITATION LIST

Patent Literature

PTL 1: Japanese Patent Application Laid-Open Publication No. H11-154155

Non-Patent Literature

NPL 1: F. Chang et al., "Bigtable: A distributed storage system for structured data", In Proc. OSDI, 2006, pp 205-218.

SUMMARY OF INVENTION

Technical Problem

The distributed processing foundation used in recent years needs analysis of the semi-structured data. When the analysis is needed, and when the method using the columnstore indicated in the NPL 1 and the PTL 1 is adopted, problems occur as follows.

In the information processing system using the distributed processing foundation, when the columnstore is used, extra data by an amount of the data newly stored in the columnstore needs to be included in the information processing system. On the other hand, the information processing system using the distributed processing foundation stores the redundant data to improve fault tolerance of the data. Due to the two points described above, when the information processing system using the distributed processing foundation adopts the columnstore, the extra data needs to be provided.

Solution to Problem

To solve the problems described above, according to one aspect of the present invention, an information processing system performing storage of data and analysis of the stored data in response to a request from an external apparatus, the information processing system includes:

a plurality of data storage units each configured to provide a storage area of the data;

a plurality of data structure operation units each associated with the each data storage unit and configured to perform a predetermined operation on a data structure of the data stored in the data storage unit;

a plurality of data redundancy units each associated with the each data storage unit and configured to transmit any of the data stored in the data storage unit to the other data storage unit;

a data placement determination unit configured to determine in which of a plurality of the data storage units the data requested from the external apparatus is to be stored;

a data redundancy determination unit configured to cause a plurality of the data redundancy units to transmit any of the data to the other data storage unit;

a data structure operation determination unit configured to cause the each data structure operation unit to operate the data structure of the data stored in the data storage unit;

a data structure management information retaining unit configured to retain data structure management data that is information about the data to be stored in the plurality of the data storage units and the data structure of the data; and an analysis processing unit configured to receive an analysis request on the data stored in the data storage unit from the external apparatus and perform analysis processing on the data according to the analysis request, wherein the data placement determination unit acquires, on the data for which storage request has been received from the external apparatus, the number of pieces of data stored in the information processing system and the data structure of the data to be stored that are previously set, determines the data storage unit in which the data according to the storage request is to be stored, with reference to the data structure management information about corresponding data stored in the data structure management information retaining unit, and then notifies the external apparatus, wherein the data redundancy determination unit instructs the data redundancy unit to create a replica of the data according to the storage request with reference to the data structure management information retaining unit and perform transmission to the data storage unit that is a storage destination of the created replica, wherein the data structure operation determination unit transmits to the data structure operation unit an instruction for performing a data operation on the data stored in any of the data storage units in which the replica is stored with reference to the data structure management information recorded in the data structure management information retaining unit, and wherein the analysis processing unit performs the analysis processing based on either of the data after the data structure operation and the data of unoperated data structure, both of the data being stored in any of the data storage units depending on a content of the analysis request.

Further, another embodiment of the present invention is a control method of the information processing system.

Advantageous Effects of Invention

According to the present invention, the information processing system and the control method thereof can be provided that can perform the analysis of the semi-structured data at a high speed without including the extra data in the information processing system while maintaining the fault tolerance of the data.

BRIEF DESCRIPTION OF DRAWINGS

FIG. 4 illustrates a configuration example of an analysis request setting screen 61.

FIG. 5 illustrates a configuration example of a data structure management table 70.

FIG. 18 is a configuration example of a data structure/ statistics information management table 70A.

DESCRIPTION OF EMBODIMENTS

With reference to figures, embodiments for implementing the present invention will be described below.

EXAMPLE 1

Figure 1:
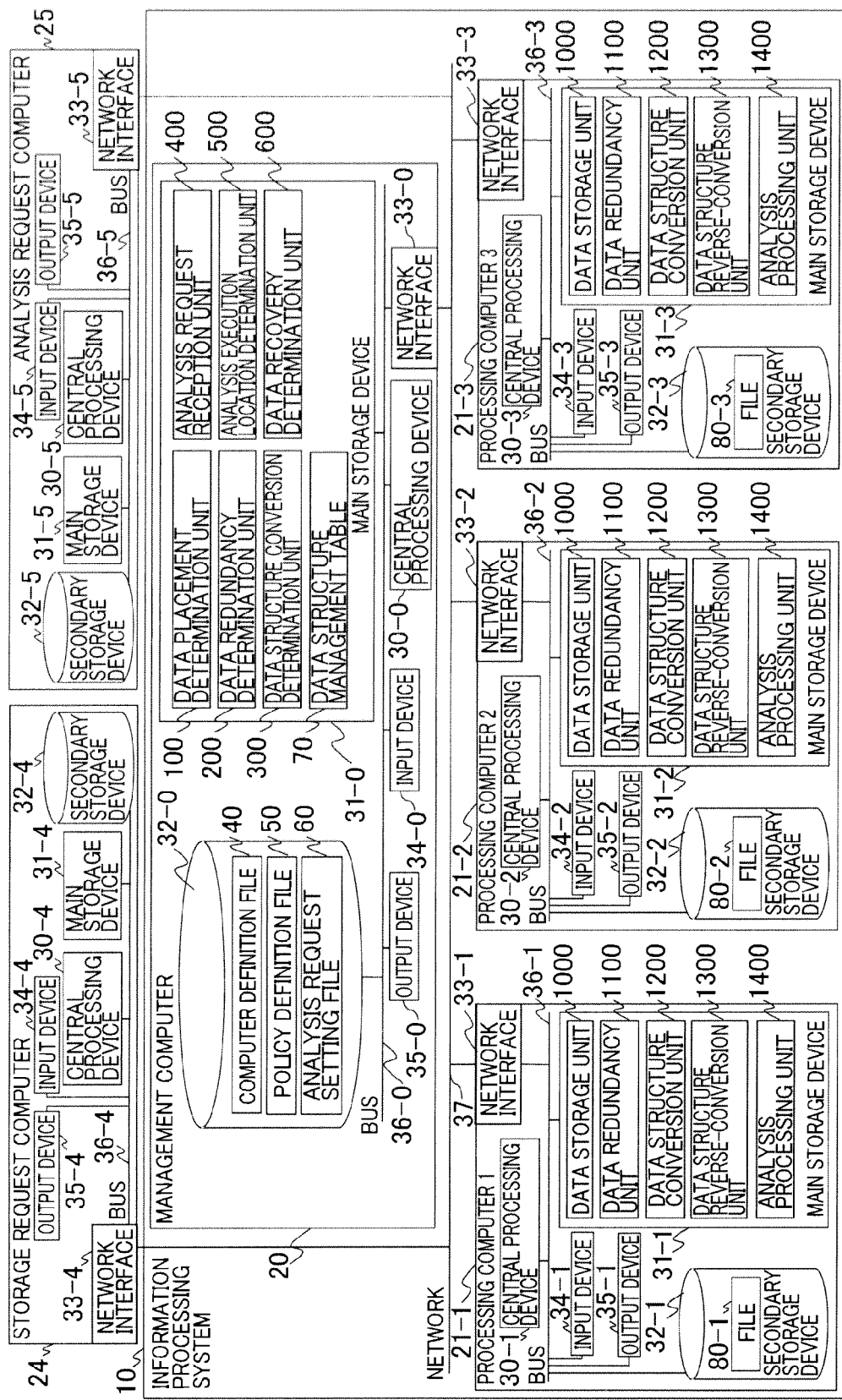
FIG. 1 illustrates a configuration example of an information processing system 10 according to a first embodiment.

FIG. 1 illustrates an entire configuration of an information processing system 10 according to a first embodiment.

A hardware configuration example of an information processing system 10 according to the first embodiment of the present invention will be described. The information processing system 10 includes a management computer 20 and processing computers 1 to 3 (21-1 to 21-3). In FIG. 1 illustrating an example of the present embodiment, the information processing system 10 includes three processing computers, but may include four or more. Further, according to an example illustrated in FIG. 1, one management computer 20 is provided, but, depending on a redundancy structure, a plurality of management computers 20 may be operated. The management computer 20 and the processing computer 30 each include central processing devices 30-0 to 30-3, main storage devices 31-0 to 31-3, secondary storage devices 32-0 to 32-3, network interfaces 33-0 to 33-3, input devices 34-0 to 34-3, output devices 35-0 to 35-3 therein, and their elements are mutually connected with one another via buses 36-0 to 36-3.

As the computer for using the information processing system 10, a storage request computer 24 and an analysis request computer 25 are provided and each include central processing devices 30-4, 30-5, main storage devices 31-4, 31-5, secondary storage devices 32-4, 32-5, network interfaces 33-4, 33-5, input devices 34-4, 34-5, and output devices 35-4, 35-5 therein, and their elements are mutually connected with one another via buses 36-4, 36-5.

The central processing devices 30-0 to 30-5 include a central processing unit (CPU) and a micro processing unit (MPU). The main storage devices 31-0 to 31-5 include a random access memory (RAM) and a read only memory (ROM). The secondary storage devices 32-0 to 32-5 include a hard disk drive (HDD) and a semiconductor disk (solid state disk ((SSD)). The network interfaces 33-0 to 33-5 include an Ethernet network interface card (NIC). Further, the management computer 20, the processing computers 21-1 to 21-3, the storage request computer 24, and the analysis request computer 25 are mutually, communicably connected with one another via the network interfaces 33-0 to 33-5 included in each computer by a network 37. Furthermore, the input devices 34-0 to 34-5 for using the information processing system 10 include devices such as a keyboard and a mouse. The output devices 35-0 to 35-5 include a device such as a liquid crystal monitor.

With reference to FIG. 1, a software configuration example of the management computer 20 will be described. The main storage device 31-0 of the management computer 20 stores a data placement determination unit 100, a data redundancy determination unit 200, a data structure conversion determination unit 300, an analysis request reception unit 400, an analysis execution location determination unit 500, and a data recovery determination unit 600. The processing units described above can be realized when the central processing device 30-0 executes a software program corresponding to a function of each processing unit, but also can be realized as a hardware. According to the present embodiment, each processing unit that can be realized when the central processing device 30-0 operates the each processing unit is described as a main subject for each processing, but, when the each processing unit is realized as the hardware, mainly the each processing unit performs each processing. Further, the main storage device 31-0 of the management computer 20 stores the data structure management table 70.

The each processing unit of the software of the management computer 20 will be described below.

When the file is stored in the information processing system 10, the data placement determination unit 100 determines to which processing computer 21 the storage request computer 24 should first transmit the file, and then performs processing for giving the instruction to the storage request computer 24. Hereinafter, the file first transmitted by the storage request computer 24 to the information processing system 10 is referred to as an "original file".

The data redundancy determination unit 200 performs, on the file stored in the processing computer 21, processing for giving an instruction of file redundancy so as to satisfy a redundancy level of the file according to (refer to FIG. 3) the policy definition file 50.

Figures 2, 3:
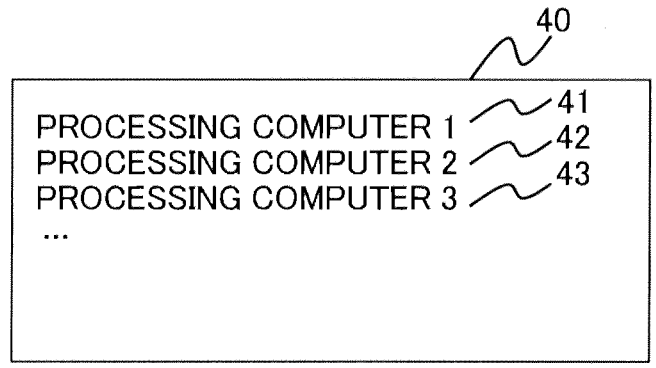
FIG. 2 illustrates a configuration example of a computer definition file 40.
FIG. 3 illustrates a configuration example of a policy definition file 50.

The data structure conversion determination unit 300 performs, on the file made redundant in the information processing system 10 by the data redundancy determination unit 200, the processing for giving an instruction of data structure conversion processing or data structure reverse-conversion processing on a file made redundant to satisfy a retention ratio of the data structure according to the policy definition file 50 (refer to FIG. 3 for details). Details of the data structure conversion processing and the data structure reverse-processing will be described later.

The analysis request reception unit 400 receives an analysis request transmitted from the analysis request computer 25 and performs processing for invoking the analysis execution location determination unit 500.

The analysis execution location determination unit 500 analyzes the analysis request from the analysis request computer 25 received by the analysis request reception unit 400, determines the processing computer 21 that performs the analysis processing using setting of an analysis request setting screen 61 (refer to FIG. 4), and then instructs the analysis processing in response to the analysis request.

To maintain the redundancy level of the file according to the policy definition file 50 (refer to FIG. 3) when the failure occurs with the computer, the data recovery determination unit 600 performs processing for giving an instruction to the each processing computer 21 to recover the file as necessary.

With reference to FIG. 1, configuration elements of the management computer 20 and the secondary storage device 32-0 will be described. The secondary storage device 32-0 of the management computer 20 stores a computer definition file 40 (refer to FIG. 2), a policy definition file 50 (refer to FIG. 3), and an analysis request setting file 60. Details of each element will be described below.

With reference to FIG. 1, a software configuration example of the processing computers 21-1, 21-2, 21-3 will be described. Since the software of the processing computer 1 (21-1), the processing computer 2 (21-2), and the processing computer 3 (21-3) have the same configuration, the software configuration of the processing computer 1 (21-1) is representatively described as an example. The main storage device 31-1 stores a data storage unit 1000, a data redundancy unit 1100, a data structure conversion unit 1200, a data structure reverse-conversion unit 1300, and an analysis processing unit 1400. The processing units described above can be realized when the central processing device 30-1 executes the software program corresponding to the function of each processing unit, but also can be realized as the hardware. According to the present embodiment, each processing unit that can be realized when being operated by the central processing device 30-1 is described as a main subject of each processing, but, when the each processing unit is realized by the hardware, mainly the each processing unit performs each processing.

With reference to FIG. 1, the each processing unit of the software of the processing computer 1 (21-1) will be described.

The data storage unit 1000 receives the file transmitted from the storage request computer 24 and performs the processing for storing the file in the secondary storage device 32-1 in the processing computer 1 (21-1).

Upon reception of the instruction given by the data redundancy determination unit 200 of the management computer 20, the data redundancy unit 1100 performs processing for transmitting the file stored in the secondary storage device 32-1 of the process computer 1 (21-1) to another computer.

The data structure conversion unit 1200 and the data structure reverse-conversion unit 1300 perform processing for converting or reverse-converting the data structure of the file stored in the secondary storage device 32-1 in the processing computer 1 (21-1). The data structure conversion unit 1200 performs processing for receiving a file name as an input, and converting the data structure of the file into that of a converted file. Hereinafter, the file converted and output by the data structure conversion unit 1200 is referred to as a "converted file". Further, the data structure reverse-conversion unit 1300 outputs an original data obtained by reverse-converting the data structure of the input converted file. Specific examples of the conversion and the reverse conversion will be described below. According to the present embodiment, as the data structure of the original file, a comma separated values (CSV) format is described as an example. However, the present invention can be adopted to the data structure such as an XML format or a ZIP compression format as long as the data can be reverse-converted according to a certain rule. The data structure conversion unit 1200 performs processing for transposing the data from row data to column data in the CSV file, and the data structure reverse-conversion unit 1300 performs processing for transposing the data from the column data to the row data therein.

Upon reception of the instruction given by the analysis execution location determination unit 500 operated by the management computer 20, the analysis processing unit 1400 performs processing for analyzing a query included in the analysis request, analyzing the data in the file stored in the secondary storage device 32-1 of the processing computer 1 (21-1), and then returning an analysis result to the analysis request computer 25. According to the present embodiment, a language similar to the structured query language (SQL) is used as a query language, but any data analysis language can be adopted to the present invention. The analysis processing unit 1400 performs processing for analyzing the query used by the information processing system 10 on the file in the CSV format stored in the secondary storage device 32-1, and returns a result.

With reference to FIG. 1, configuration elements of the secondary storage devices 32-1 to 32-3 of the processing computers 21-1 to 21-3 respectively will be described. The secondary storage devices 32-1 to 32-3 of the processing computers 21-1 to 21-3 store files 80-1 to 80-3 respectively managed by the information processing system 10. The files 80-1 to 80-3 managed by the information processing system 10 are stored as either of the original file and the converted file in which the data structure has been converted. The file stored in each of the computers 21-1 to 21-3 is not limited to one file but a plurality of files may be stored.

The computer definition file 40 will be described. FIG. illustrates a configuration example of the computer definition file 40. The computer definition file 40 is stored in the secondary storage device 32-0 of the management computer 20. Processing computers 41 to 43 managed by the management computer 20 are specified for computer definition file 40. According to the present embodiment, host names (processing computers 1 to 3) of each of the processing computers 21-1 to 21-3 are used to specify the processing computer, but, a method of using an IP address can be also specified in which each of the processing computers 21-1 to 21-3 can be uniquely specified.

The policy definition file 50 will be described below. FIG. 3 illustrates a configuration example of the policy definition file 50. The policy definition file 50 is stored in the secondary storage device 32-0 of the management computer 20. A redundancy level 51 of the file indicating in how many layers the files are retained for redundancy can be defined for the policy definition file 50. Further, of the file retained in a plurality of layers in the system, a retention ratio 52 between the original file and the converted file that defines the retention ratio of the data structure can be defined. For example, when it is defined that the redundancy level of the file is "3" and the retention ratio between the original file and the converted file is 2:1, with reference to the policy definition file 50, the management computer 20 stores total three files including two original files before conversion and one converted file after conversion for each file stored in the information processing system 10 distributedly into each of the processing computers 21-1 to 21-3.

FIG. 4 illustrates a screen example of the analysis request setting screen 61 for editing the analysis request setting file 60 to be stored in the secondary storage device 32-0 of the management computer 20. Inputting/outputting to/from the screen are performed via the input device 34-0 and the processing computer 35-0 of the management computer 20, but the input and output processing can be performed via the input device and the output device of another computer. As to the query specified when the analysis request is issued from the analysis request computer 25 to the information processing system 10, user using the information processing system 10 can explicitly specify whether the converted file is used for each query. According to the example of the screen illustrated in FIG. 4, it is defined that, when any file is analyzed, a query 62 for calculating a total value of specific column values and a query 63 for calculating an average value thereof use the converted file. Further, it is defined that a query 64 for extracting a value of a specific column, when any file is analyzed, uses the converted file if the number of the columns is specified as "1" or more and "4" or less. For the query that has not been defined in the screen, the original file is used. Furthermore, for a list 65 in which the query is registered, the user can freely add or delete the query using an addition button 66 or a deletion button 67. The queries 62, 63, 64 defined in the screen are an example, and the queries are not limited thereto. According to the present embodiment, the query language of the SQL base is used, but, other general query languages can be also used.

The data structure management table 70 will be described. FIG. 5 illustrates a configuration example of the data structure management table 70. The data structure management table 70 is stored in the main storage device 31-0 of the management computer 20. The columns 71-1 to 71-3 of the data structure management table 70 represent the files and their formats retained in the secondary storage devices 32-1 to 32-3 of the processing computers 21-1 to 21-3 respectively. Further, rows 72-A to 72-C of the data structure management table 70 indicates in which processing computers 21-1 to 21-3 and in which storage format a certain file is retained. The example illustrated in FIG. 5 indicates a retention state of the file disposed in each processing computers 21-1 to 21-3, with three processing computers 21-1 to 21-3 and the files of three types set. In FIG. 5, retaining the original file that has not yet converted is represented as "0" and retaining the converted file that has been converted is represented as "1". When the processing computers 21-1 to 21-3 retain no files, "−1" is indicated.

An example of what is meant in the data structure management table 70 will be described below. In the data structure management table 70 illustrated in FIG. 5, the column 71-1 represents that the processing computer 1 stores the original files before conversion of the files A and C and the converted file after conversion of the file B in the secondary storage device 32-1. Further, the row 72-A represents that the original file before conversion of the file A is stored in the processing computer 1 and the processing computer 2, and the converted file after conversion of the file A is stored in the secondary storage devices 32-1 to 32-3 of the processing computer 3.

Finally, an example of an updating method of the data structure management table 70 will be described. Since the data structure management table 70 represents the file retained by each of the processing computers 21-1 to 21-3 and their structures, when it is updated, the formats of the files retained by all processing computers 21-1 to 21-3 are checked to update each of items 73-A1 to 73-C3 of the data structure management table 70.

Figure 6:
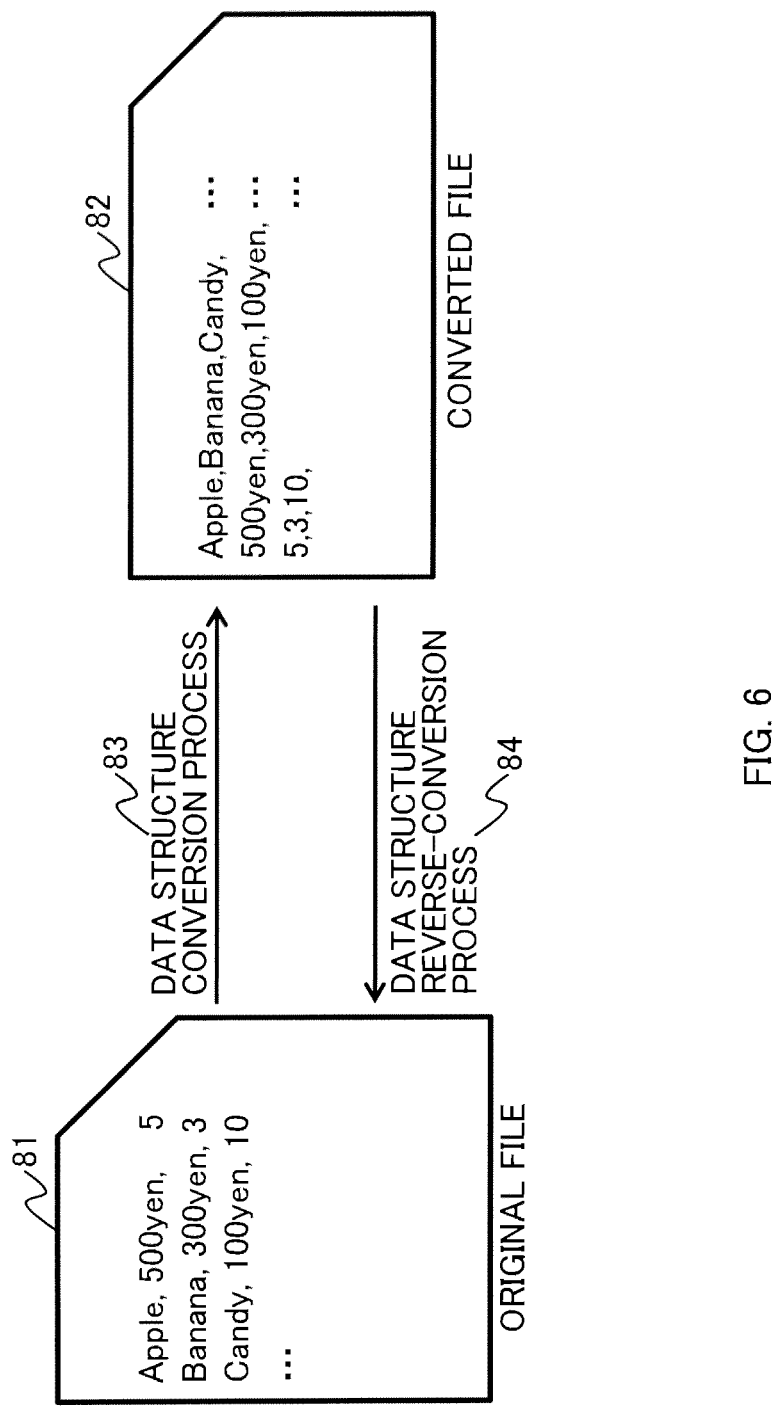
FIG. 6 is a schematic diagram illustrating a data conversion processing example according to the present embodiment.

FIG. 6 illustrates an example of a file when it is assumed that the processing is performed according to the present embodiment and its format. According to the present embodiment, the original file 81 transmitted to the information processing system 10 by the storage request computer 24 is the file in the CSV format in which one line is treated as one record and a value of each record is divided with a comma, which is a dividing character. The data structure conversion unit 1200 according to the present embodiment performs data structure conversion processing 83, which is the conversion processing for transposing the row and the column of the CSV file with each other to store them. The converted file 82 in which the row and the column of the original file are transposed with each other by the data structure conversion unit 1200 is also the file in the CSV format. The data structure reverse-conversion unit 1300 according to the present embodiment performs the data structure reverse-conversion processing 84, which is the conversion processing for transposing the row and the column with each other again, on the converted file 82 in which the row and the column is transposed with each other by the data structure conversion unit 1200. In other words, if the data structure conversion unit 1200 adopts the data structure conversion processing 83 on the original file 81 and, after obtaining the converted file 82, the data structure reverse-conversion unit 1300 further adopts the data structure reverse-conversion processing 84, the original file 81 can be obtained. Details of the data structure conversion processing 83 and the data structure reverse-conversion processing 84 will be described below.

The present embodiment will be described, using the file in the CSV format as the original file and the converted file, and based on a processing example in which the row and the column of the file in the CSV format are transposed with each other as the data structure conversion processing and the data reverse-conversion processing. However, as other examples, other conversion processing and reverse-conversion processing can be adopted that include combination of an expanded file and a compressed file as the original file and the converted file, compression processing as the data structure conversion processing, and expansion processing as the data structure reverse-conversion processing, and combination of a decoded file and an encrypted file as the original file and the converted file, the encryption processing as the data structure conversion processing, and the decoding processing as the data structure reverse-conversion processing.

Figure 7:
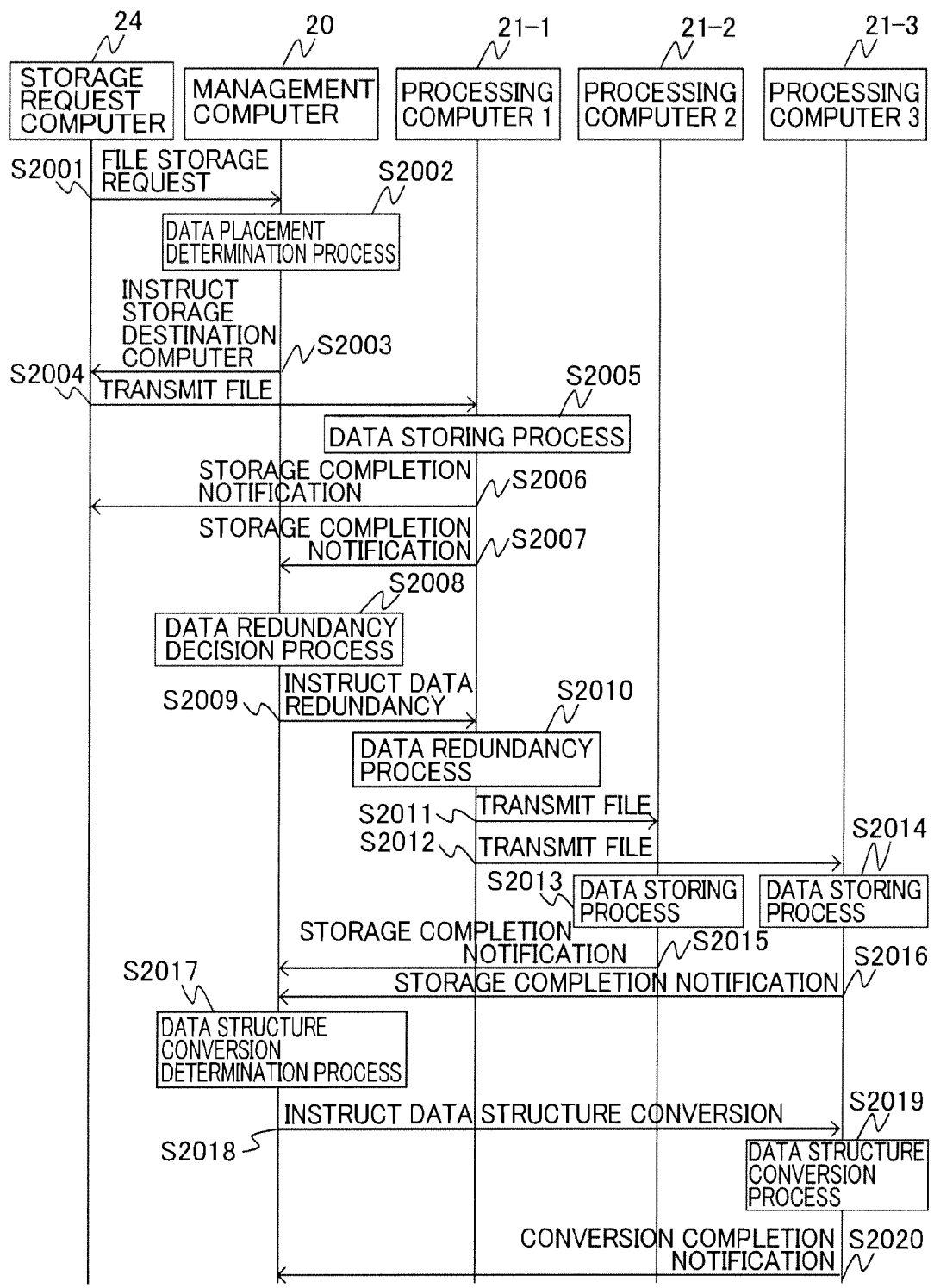
FIG. 7 is an example of a sequence diagram illustrating processing when a file is copied to the information processing system 10.

File copy processing by the information processing system 10 will be described. FIG. 7 is an example of a sequence diagram illustrating processing when the file is copied to the information processing system 10 from the storage request computer 24.

When the storage request computer 24 copies the file to the information processing system 10, the storage request computer 24 issues a file storage request (S2001) to the management computer 20. Upon reception of the file storage request (S2001) from the storage request computer 24, the data placement determination unit 100 of the management computer 20 performs data placement determination processing (S2002), and notifies the storage request computer 24 of a host name of the processing computer 21 which is to be a storage destination (S2003). According to the example of the sequence diagram, the data placement determination unit 100 selects the processing computer 1 (21-1) as the processing computer 21 of the storage destination of the file. Details of the data placement determination processing (S2002) performed by the data placement determination unit 100 will be described below. The storage request computer 24 receives a content of a storage destination computer instruction (S2003) from the management computer 20, and transmits the file to the processing computer 1 (21-1) (S2004). The processing computer 1 (21-1) receives the file transmitted by the storage request computer 24 and, by the data storage processing (S2005) performed by the data storage unit 1000, stores the file in the secondary storage device 32-1 of the processing computer 1 (21-1) illustrated in FIG. 1. The file stored at this point is specified as an "original file" hereinafter. After the original file is stored, the processing computer 1 (21-1) transmits storage completion notifications (S2006, S2007) to the management computer 20 and the storage request computer 24.

After the storage completion notification (S2007) from the processing computer 1 (21-1) is received, by the data redundancy determination processing (S2008) performed by the data redundancy determination unit 200, the management computer 20 gives data redundancy instruction (S2009) of the original file. Details of the data redundancy determination processing (S2008) will be described below. The data redundancy instruction (S2009) including the host name of the processing computer 21, which is a data redundancy destination, is transmitted to the processing computer 1 (21-1) by data redundancy determination processing (S2008), and the processing computer 1 (21-1) performs data redundancy processing (S2010). The data redundancy processing (S2010) copies the specified file to another processing computer 21. As a result of the data redundancy processing (S2010), the processing computer 21 of the transmission destination of the original file can be specified. Herein, as an example, the original file stored in the secondary storage device 32-1 of the processing computer 1 (21-1) is transmitted to the processing computer 2 (21-2) and the processing computer 3 (21-3). After the original file transmitted by the processing computer 1 (21-1) is received, the processing computer 2 (21-2) and the processing computer 3 (21-3) store the original file into each of the secondary storage devices 32-2, 32-3 by the data storage processing (S2013, S2014). Finally, the processing computer 2 (21-2) and the processing computer 3 (21-3) transmit the storage completion notifications (S2015, S2016) respectively to the management computer 20.

After the management computer 20 receives the storage completion notifications (S2015, S2016) from the processing computer 2 (21-2) and the processing computer 3 (21-3) respectively, an instruction for converting the data structure is given by the data structure conversion determination processing (S2017). Details of the data structure conversion determination processing (S2017) will be described below. By the data structure conversion determination processing (S2017), the processing computer 21 for performing the data structure conversion processing is specified. Herein, as an example, the data structure conversion instruction (S2018) including the file name of the file on which the data structure conversion processing is to be performed is transmitted to the processing computer 3 (21-3). After receiving the data structure conversion instruction (S2018), the processing computer 3 (21-3) performs data structure conversion processing (S2019). Based on the file name included in the data structure conversion instruction (S2018), the data structure conversion processing (S2019) performs processing for converting the data structure of the file stored in the secondary storage device 32-3 of the processing computer 3 (21-3) to transpose the original file into the converted file. Details of the data structure conversion processing (S2019) will be described below. After the data structure is converted, the processing computer 3 (21-3) transmits conversion completion notification (S2020) to the management computer 20. As described above, the processing when the storage request computer 24 copies the file to the information processing system 10 is completed.

Figure 8:
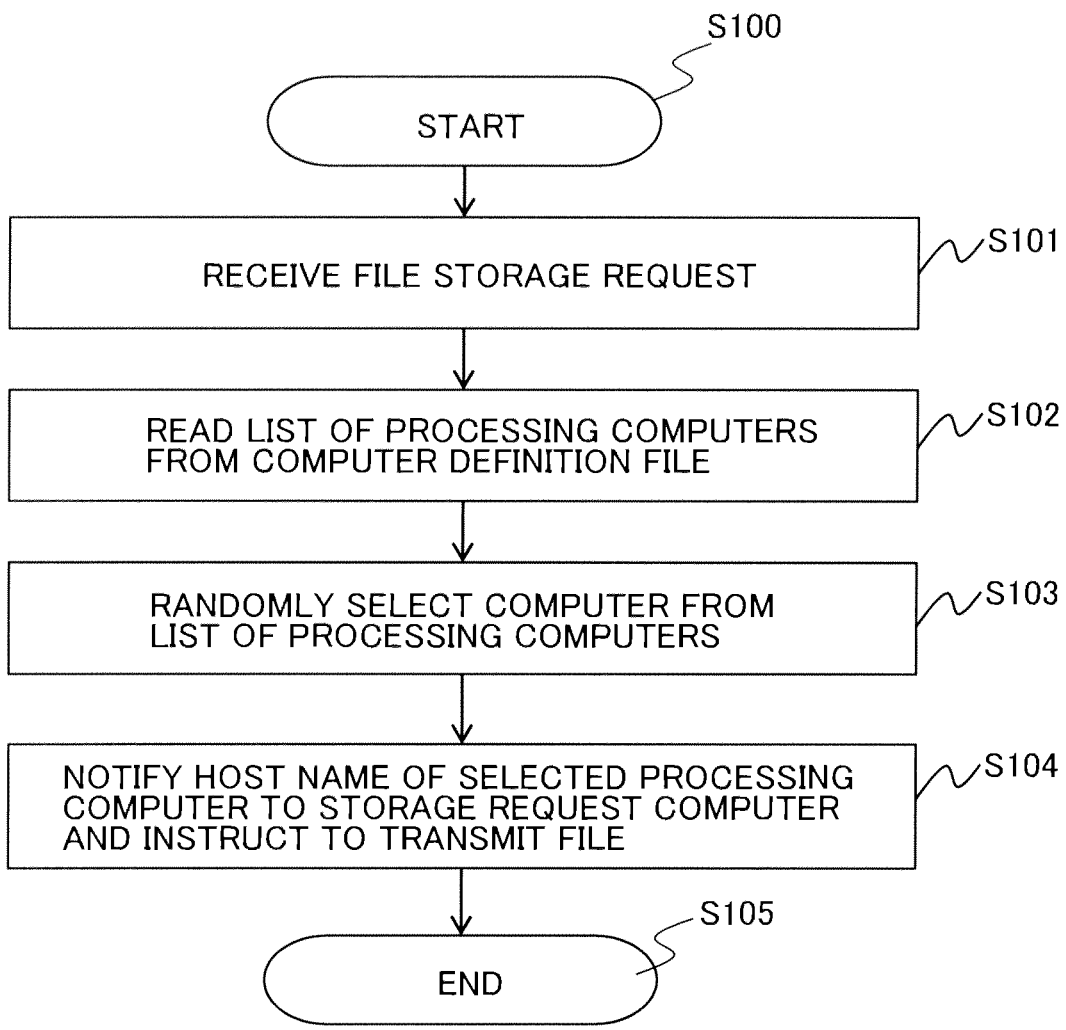
FIG. 8 is a flowchart illustrating a processing example of a data placement determination unit 100.

The data placement determination processing (S2002) performed by the data placement determination unit 100 will be described below. FIG. 8 is a flowchart illustrating an example of the data placement determination processing (S2002). In step S101, upon start of processing in step S100, the data placement determination unit 100 receives the file storage request from the storage request computer 24. The file storage request corresponds to the file storage request (S2001) illustrated in FIG. 7. In step S102, a list of the processing computers 21 is read from the computer definition file 40 illustrated in FIG. 2. In step S103, from among the read list of the processing computers 21, one computer to which the file to be firstly transmitted by the storage request computer 24 is randomly selected. The computer selected herein corresponds to the processing computer 1 (21-1) illustrated in FIG. 7. Finally, in step S104, to give an instruction for transmitting the file to the selected processing computer 21 to the storage request computer 24, the data placement determination unit 100 transmits the storage destination computer instruction to the storage request computer 24. The storage destination computer instruction herein corresponds to the storage destination computer instruction (S2003) illustrated in FIG. 7. In step S105, the data placement determination processing (S2002) performed by the data placement determination unit 100 is ended.

Figure 9:
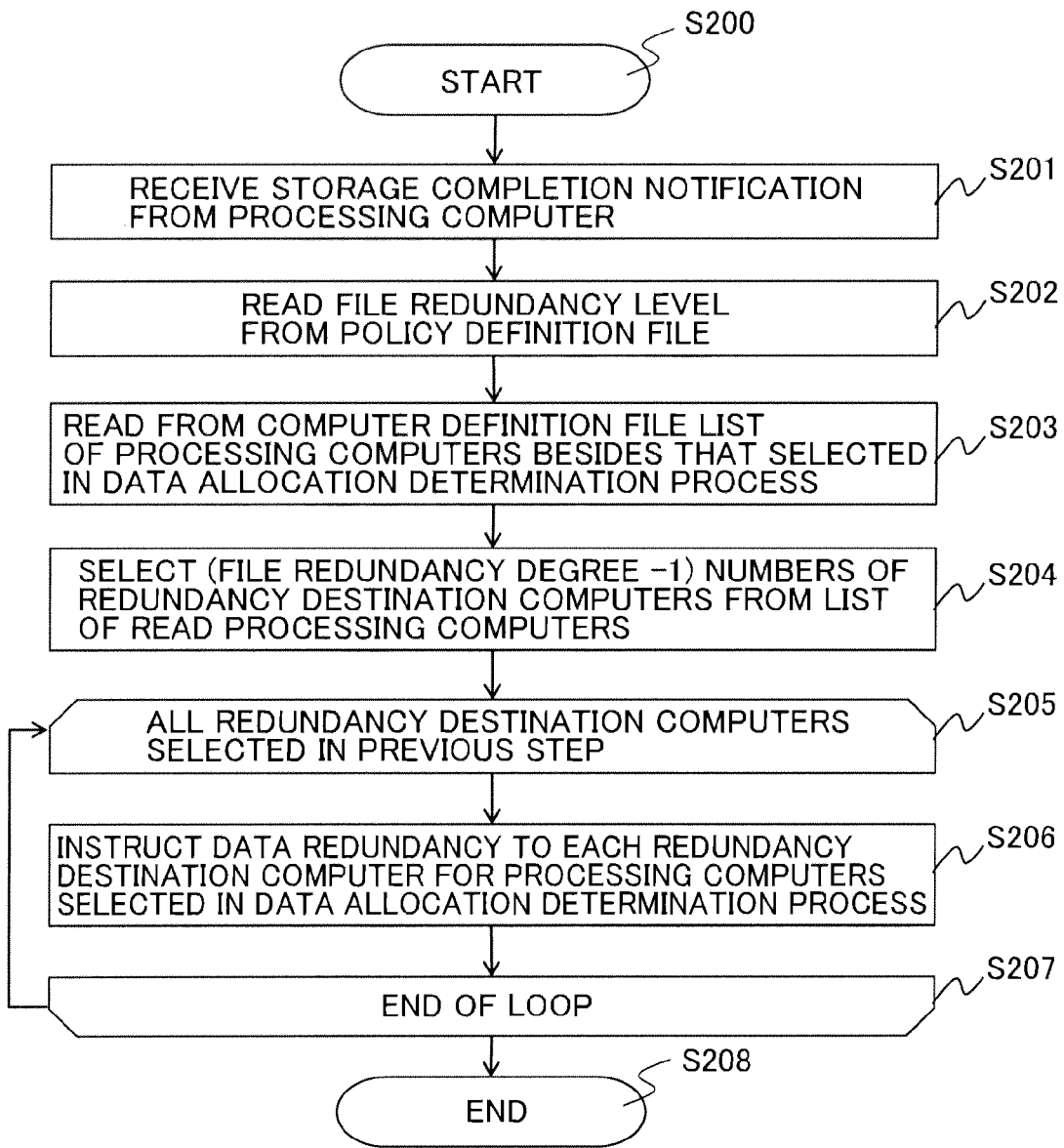
FIG. 9 is a flowchart illustrating a processing example of a data redundancy determination unit 200.

The data redundancy determination processing (S2008) performed by the data redundancy determination unit 200 will be described below. FIG. 9 is a flowchart illustrating an example of the data redundancy determination processing (S2008). In step S201, upon start of the processing in step S200, the data redundancy determination unit 200 receives the storage completion notification that has been transmitted from the processing computer 21 and is determined by the data placement determination unit 100. The storage completion notification corresponds to the storage completion notification (S2007) illustrated in FIG. 7. In step S202, the redundancy level 51 of the file to be stored is read from the policy definition file 50 illustrated in FIG. 3. In step S203, of the processing computers 21 described in the computer definition file 40, the list of the processing computers 21 other than the processing computer 21 selected by the data placement determination processing (S2002) illustrated in FIG. 8 is read. In step S204, from the list of the read processing computers 21, the redundancy destination computers of (redundancy level of the file −1) are selected. According to the sequence diagram illustrated in FIG. 7, the redundancy level of the storage target file is "3". Since the processing computer 1 (21-1) is selected in the data placement determination processing (S2002), the processing computer 2 (21-2) and the processing computer 3 (21-3) are selected as the redundancy destination computer in step S204. Finally, in steps S205 to S207, to give the instruction for the data redundancy to all redundancy destination computers selected in step S204, the data redundancy instruction is transmitted to the processing computer 21 selected in the data placement determination processing (S2002) and, in step S208, the processing is ended. The data redundancy instruction herein corresponds to the data redundancy instruction (S2009) illustrated in FIG. 7.

Figure 10:
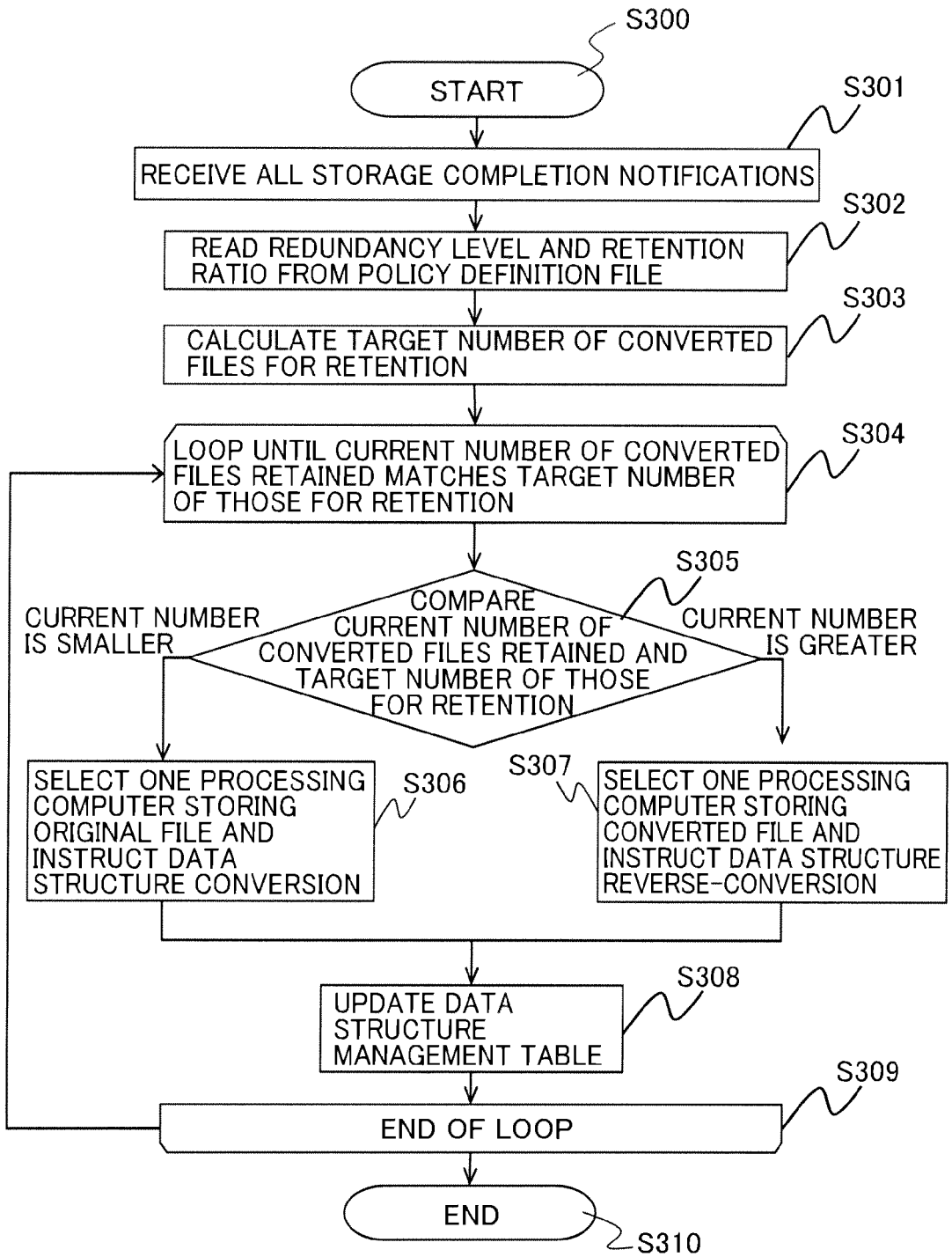
FIG. 10 is a flowchart illustrating a processing example of a data structure conversion determination unit 300.

The data structure conversion determination processing (S2017) performed by the data structure conversion determination unit 300 will be described below. FIG. 10 is a flowchart illustrating an example of the data structure conversion determination processing (S2017). In the data structure determination processing (S2017), of the redundant file on which the data redundancy determination processing (S2008) and the data redundancy processing (S2010) are performed, according to the definition of the policy definition file 50 illustrated in FIG. 3, processing for determining and instructing whether the data structure needs to be converted is performed. With reference to FIG. 10, the processing will be described below.

In step S301, upon start of the processing in step S300, the data structure conversion determination unit 300 receives all storage completion notifications returned from the data storage processing (S2013, S2014) performed by the each processing computer 21 by the data redundancy determination processing (S2008) and the data redundancy processing (S2010). The storage completion notification herein corresponds to the storage completion notifications (S2015, S2016) illustrated in FIG. 7. In step S302, the data structure conversion determination unit 300 reads the redundancy level 51 of the file and the retention ratio 52 between the original file and the converted file from the policy definition file 50 as illustrated in FIG. 2. In step S303, the data structure conversion determination unit 300 calculates the target number of the retained, converted files based on the redundancy level 51 of the file read in step S302 and the retention ratio 52 between the original file and the converted file. More specifically, the target number of the retained, converted files can be calculated by a×c/(b+c) (round down after the decimal point) when the redundancy level of the file is defined as "a" and the retention ratio is defined as "b:c".

With reference to the data structure management table 70 illustrated in FIG. 5, the data structure conversion determination unit 300 repeatedly performs steps S304 to S309 until the current number of the retained, converted files corresponds to the target number of the retained, converted files calculated in step S303. When the current number of the retained, converted files does not correspond to the target number thereof calculated in step S303, the both numbers described above are further compared with each other. When it is determined that the current number of the retained, converted file is smaller than the target number thereof in step S305 (the current number is smaller), then in step S306, the data structure conversion determination unit 300 performs processing of step S306 to select one processing computer 21 storing the original file and instruct conversion of the data structure. The conversion instruction of the data structure includes the name of the file to be converted. Further, when it is determined that the current number of the retained, converted file is larger than the target number thereof in step S305 (the current number is larger), then in step S307, the data structure conversion determination unit 300 performs processing of step S307 to select one processing computer storing the converted file and instruct the reverse-conversion of the data structure. The reverse-conversion instruction of the data structure includes the name of the file to be converted. Finally, in S308, the data structure conversion determination unit 300 updates the data structure management table 70, and returns to step S304 until the current number of the retained, converted files corresponds to the target number thereof.

For example, when the redundancy level 51 of the storage target file recorded in the policy definition file 50 is "3", and the retention ratio 52 between the original file and the converted file is 2:1, at the time of first step S305, by the data redundancy determination processing (S2008) illustrated in FIG. 7, the number of the retained original files is "3" and the number of the retained converted file is "0". Further, the target number of the retained, converted files is "1" based on the calculation of the target number thereof obtained in step S303. Therefore, step S306 is performed and, in step S310, the original file is converted into the converted file and the current number of the retained, converted files becomes "1", and the processing is ended since the current number thereof corresponds to the target number thereof.

Figure 11:
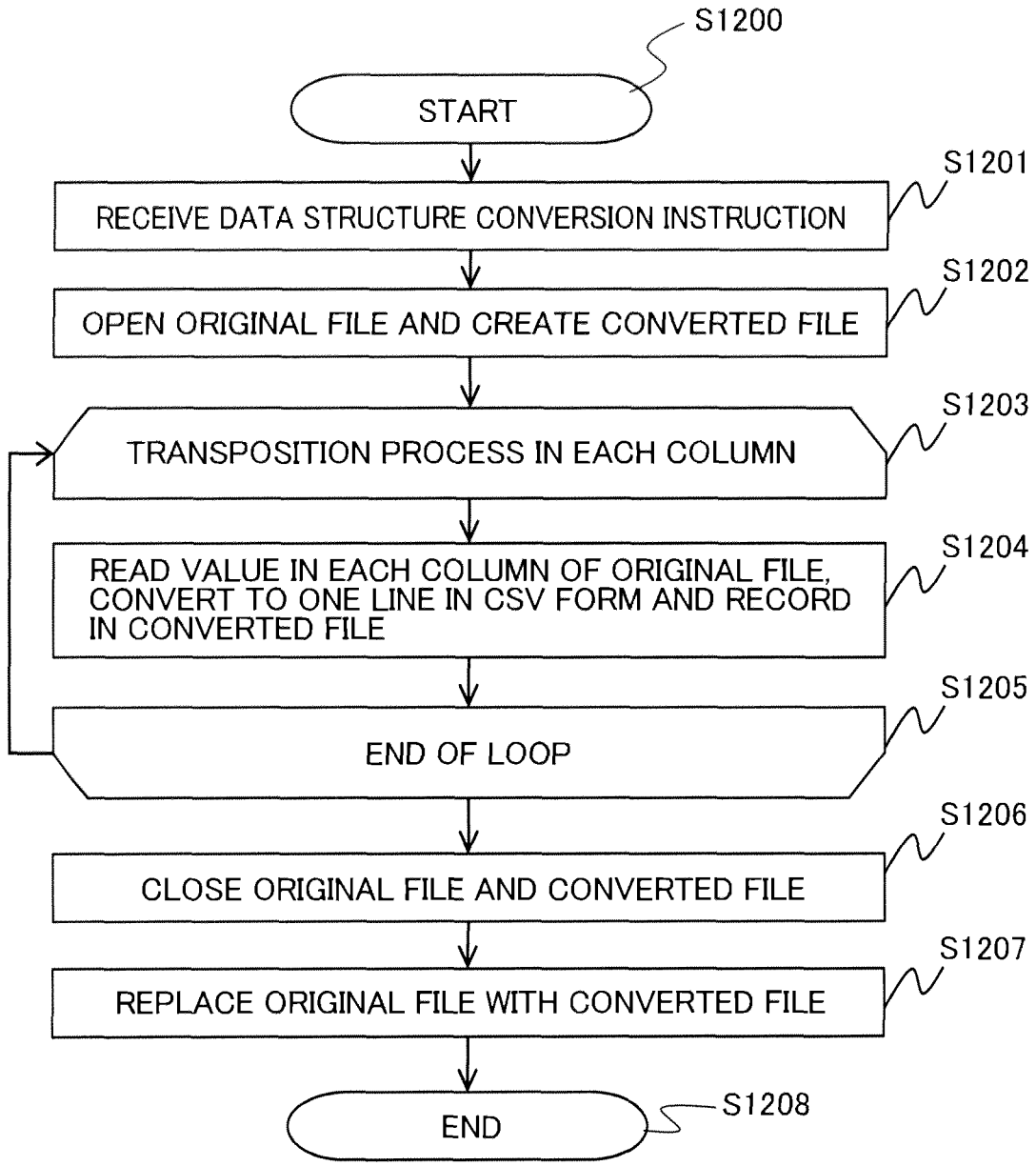
FIG. 11 is a flowchart illustrating a processing example of a data structure conversion unit 1200.

The data structure conversion processing (S2019) performed by the data structure conversion unit 1200 will be described below. FIG. 11 is a flowchart illustrating an example of the data structure conversion processing (S2019). The data structure conversion processing (S2019) performs processing for creating and storing the converted file, in which the row and the column are transposed with each other, on the original file in the CSV format illustrated in FIG. 6. With reference to FIG. 11, the processing will be described below.

In step S1201, upon start of the processing in step S1200, the data structure conversion unit 1200 receives a data structure conversion instruction from the management computer 20. The data structure conversion instruction corresponds to the data structure conversion instruction (S2018) illustrated in FIG. 7. The data structure conversion instruction includes the file name of the file to be converted, and the file is referred to as an original file. The file created by the data structure conversion processing is referred to as a converted file.

In step S1202, the data structure conversion unit 1200 opens the original file and creates an empty converted file. The data structure conversion unit 1200 repeatedly performs steps S1203 to S1205 for performing transposition processing for each row on values of each column of the original file. In step S1204, in the processing, the value of each column is sequentially read, converted into the file in the CSV format in one line divided with a comma in an order of being read, and then added to the converted file. After the processing of steps S1203 to S1205 is performed, in step S1206, the original file and the converted file are closed, in step S1207, the original file is replaced with the converted file, and then in step S1208, the processing is ended. As described with reference to FIG. 6, the processing for transposing the row and the column in the CSV format as the data structure conversion processing is an example according to the present embodiment, and the processing is not limited thereto.

Figure 12:
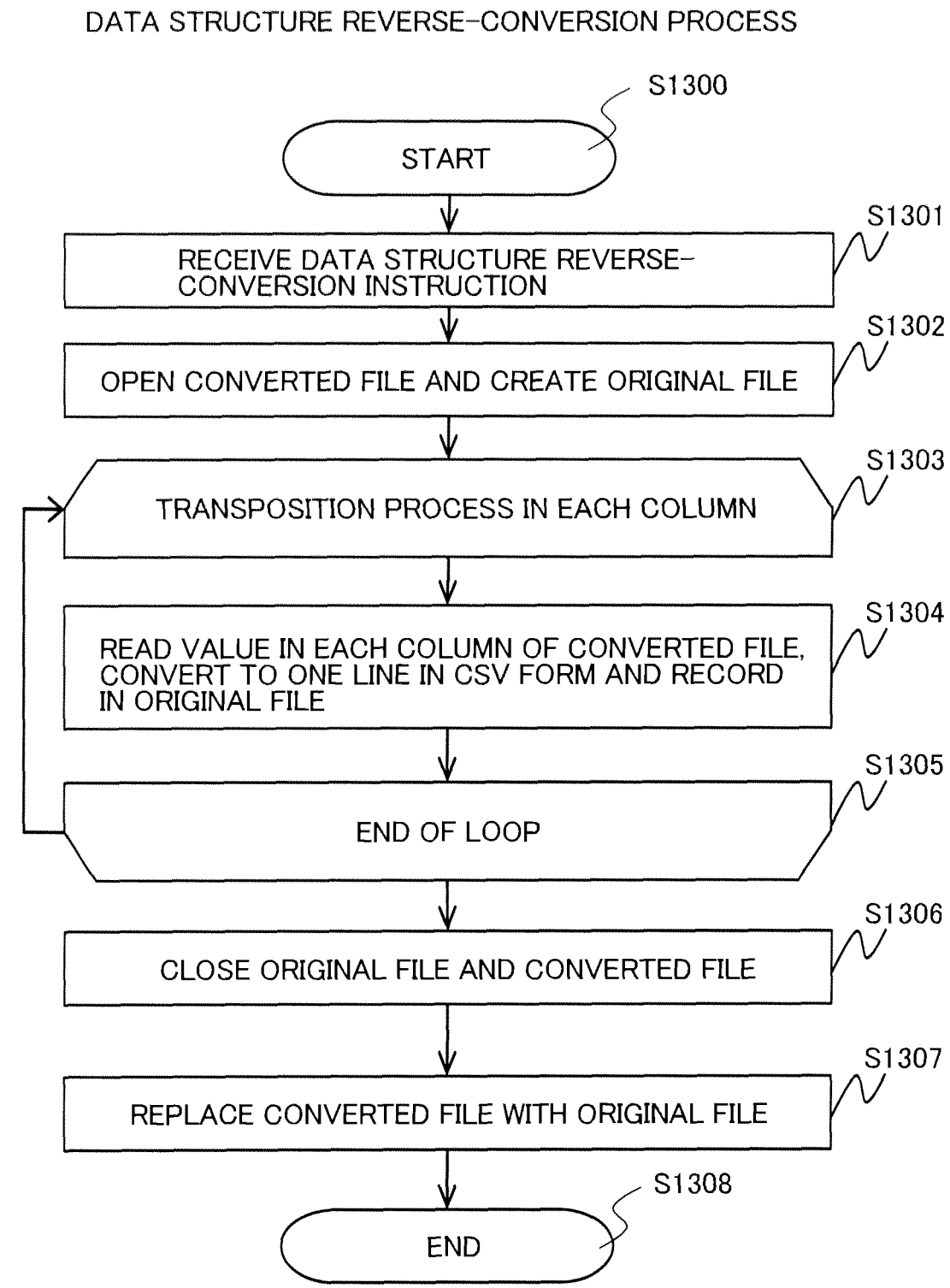
FIG. 12 is a flowchart illustrating a processing example of a data structure reverse-conversion unit 1300.

The data structure reverse-conversion processing performed by the data structure reverse-conversion unit 1300 will be described below. FIG. 12 is a flowchart illustrating an example of the data structure reverse-conversion processing. The data structure reverse-conversion processing performs processing for creating and storing the converted file, in which the row and the column are transposed with each other, on the converted file in the CSV format illustrated in FIG. 6. With reference to FIG. 12, the processing will be described below.

In step S1301, upon start of the processing in step S1300, the data structure reverse-conversion unit 1300 receives the data structure reverse-conversion instruction from the management computer 20. The data structure reverse-conversion instruction includes the file name of the file to be reverse-converted. The file is referred to as the converted file, and the file created by the data structure reverse-conversion processing is referred to as the original file.

In step S1302, the data structure reverse-conversion unit 1300 opens the converted file, and creates an empty original file.

The data structure reverse-conversion unit 1300 repeatedly performs steps S1303 to S1305 for performing the transposition processing for each column on the value of each column of the converted file. In step S1304, in the transposition processing, the values of each column are sequentially read, converted into those in the CSV format in one line divided with a comma in an order of being read, and then added to the original file. In step S1306, after performing the processing of steps S1303, S1304, and S1305, the data structure reverse-conversion unit 1300 closes the converted file and the original file. Instep S1307, the data structure reverse-conversion unit 1300 replaces the converted file with the original file and then, in step S1308, the data structure reverse-conversion unit 1300 ends the processing. As described with reference to FIG. 6, the processing for transposing the row and the column in the CSV format with each other as the data structure reverse conversion processing is an example according to the present embodiment, and the processing is not limited thereto.

Figure 13:
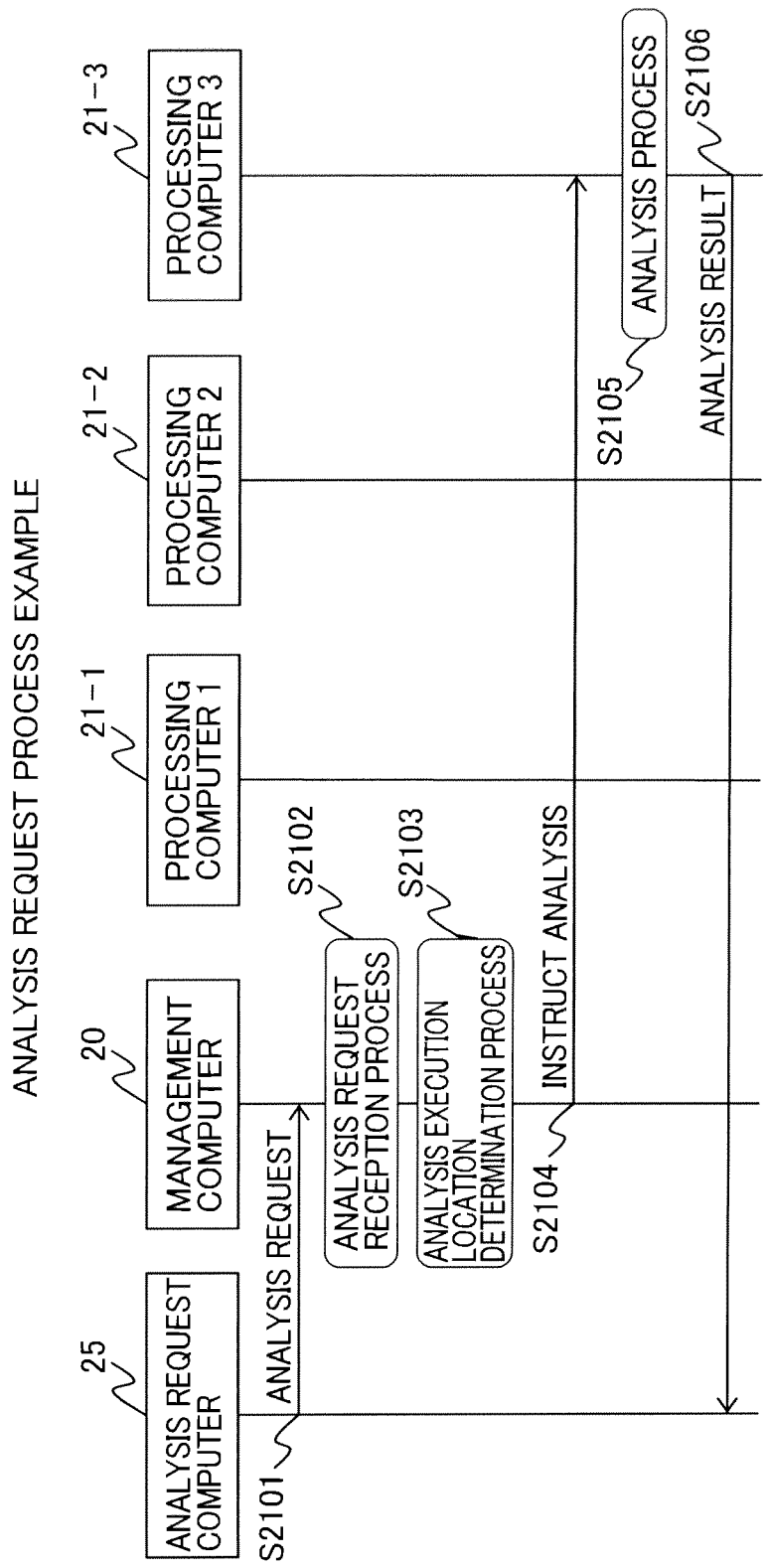
FIG. 13 is a sequence diagram illustrating a processing example when an analysis request is received according to the first embodiment.

The analysis request processing by the information processing system 10 according to the present embodiment will be described below. FIG. 13 is an example of a sequence diagram when the information processing system 10 receives the analysis request from the analysis request computer 25. The analysis request computer 25 transmits the analysis request including the query to the management computer 20. The management computer 20 receives the analysis request from the analysis request computer 25 by analysis request reception processing (S2102), and determines the computer for performing the analysis by analysis execution location determination processing (S2103). Details of the analysis execution location determination processing (S2103) will be described below.

The management computer 20 transmits an analysis instruction (S2104) to the processing computer 21 determined by the analysis execution location determination processing (S2103). According to the example of the sequence diagram, the analysis execution location determination processing (S2103) selects the processing computer 3 (21-3), which is not limited. The processing computer 3 (21-3) that has received the analysis instruction (S2104) performs the analysis by the analysis processing (S2105), and transmits the analysis result (S2106) to the analysis request computer 25. With the processing described above, the analysis request computer 25 can obtain the analysis result (S2106) for the analysis request (S2101).

Figure 14:
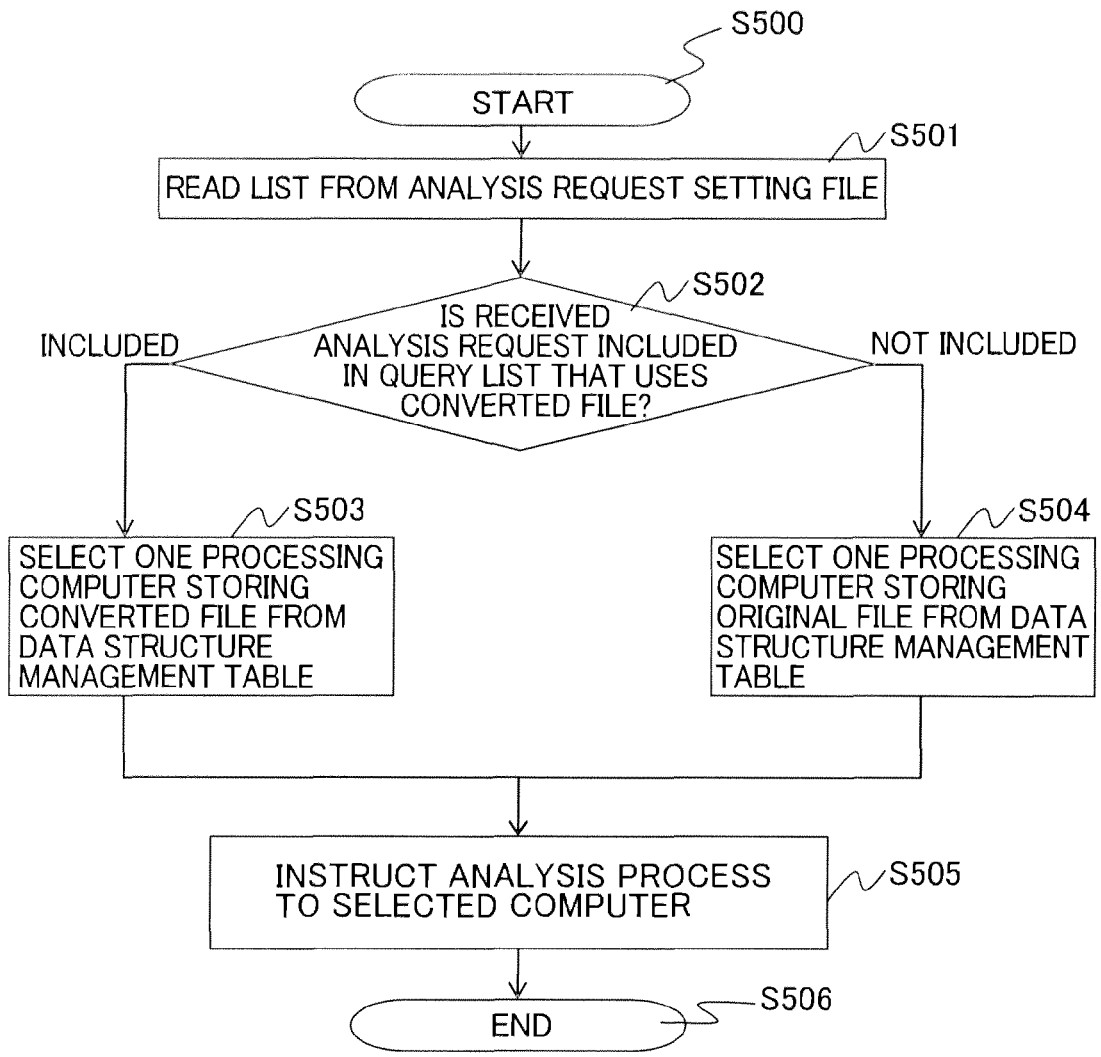
FIG. 14 is a flowchart illustrating a processing example of an analysis execution location determination unit 500.

The analysis execution location determination processing (S2103) performed by the analysis execution location determination unit 500 will be described below. FIG. 14 is a flowchart illustrating an example of the analysis execution location determination processing (S2103). Upon start of the processing in step S500, in step S501, the analysis execution location determination unit 500 reads the list of the queries using the converted file from the analysis request setting file 60 that can be edited via the analysis request setting screen 61 illustrated in FIG. 4. In step S502, it is checked whether the query received by the analysis request reception processing (S2102) is included in the list of the queries using the converted file read in step S501. When it is determined that the query is included in the list of the queries using the converted file ("included" in step S502), the analysis execution location determination unit 500 proceeds to the processing in step S503. When it is determined that the query is not included in the list ("not included" in step S502), the processing proceeds to step S504.

When the processing proceeds to step S503, in step S503, the analysis execution location determination unit 500 selects one processing computer 21 storing the converted file from the data structure management table 70 illustrated in FIG. 5. On the other hand, when the processing proceeds to step S504, in step S504, the analysis execution location determination unit 500 selects one processing computer storing the original file from the data structure management table 70 illustrated in FIG. 5. In either of steps S503 and S504, when a plurality of computers to become a candidate are included, one computer is randomly selected from the plurality of computers. Finally, in step S505, the analysis execution location determination unit 500 instructs the analysis processing to the computer selected in either step of steps S503 and S504 and, in step S506, the processing is ended. The analysis instruction herein corresponds to that of S2104 illustrated in FIG. 13.

Figure 15:
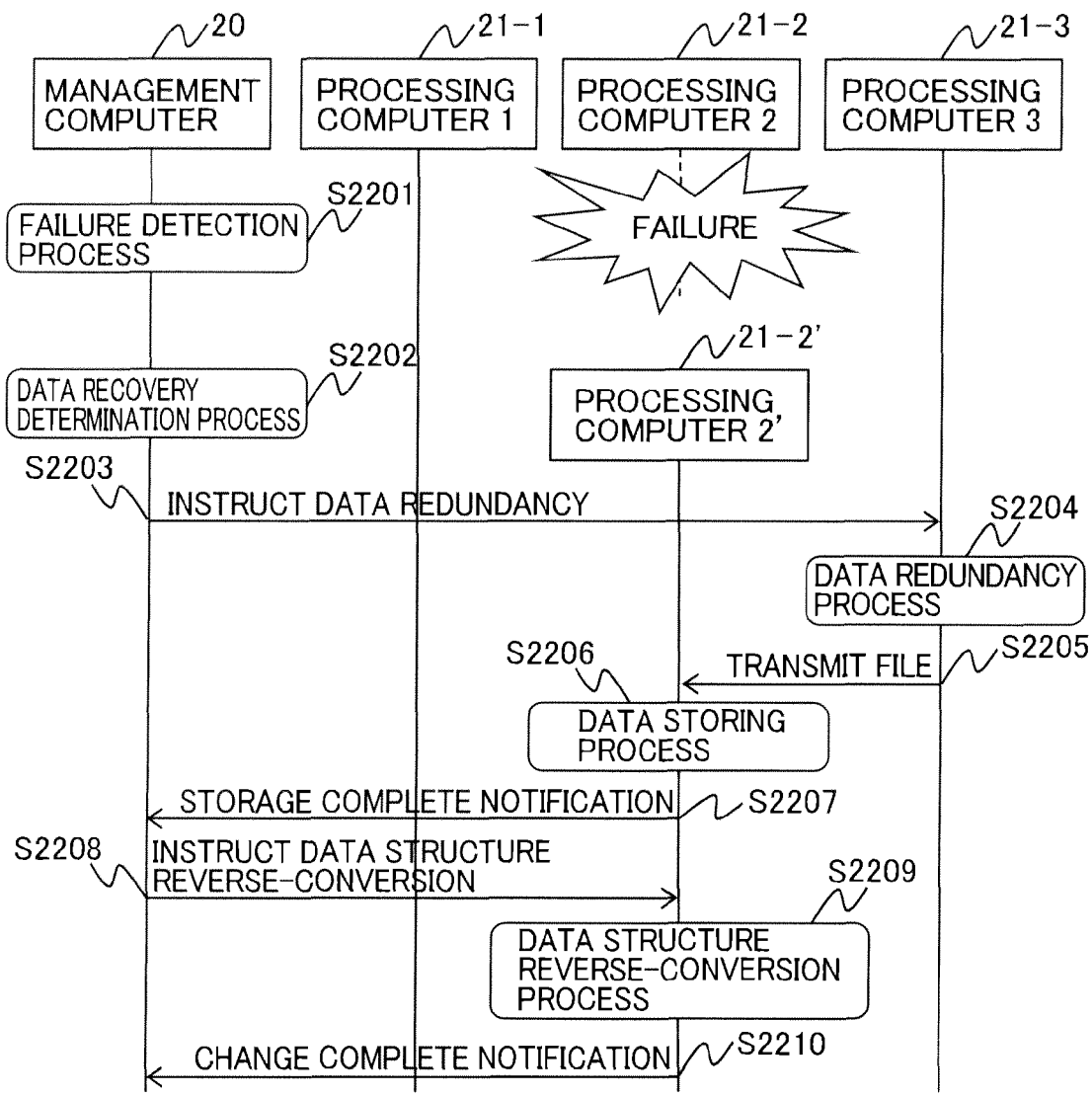
FIG. 15 is a sequence diagram illustrating a processing example when a failure occurs with a processing computer 21.

Recovery processing of the file when the failure occurs with the processing computer 21 in the information processing system 10 will be described below. FIG. 15 is an example of a sequence diagram illustrating recovery processing of the file when the failure occurs with the processing computer 21 in the information processing system 10. This sequence diagram illustrates an example of a case where, when the failure occurs with the processing computer 2 (21-2), the file is recovered by the processing computer 2' (21-2') to guarantee the redundancy level of file. With reference to FIG. 15, the processing will be described below.

The management computer 20 periodically performs failure detection processing (S2201) and checks whether no failure has occurred with each processing computer 21 described in the computer definition file 40 illustrated in FIG. 2. According to the example of the sequence diagram, it is checked whether no failure has occurred with the processing computer 1 (21-1), the processing computer 2 (21-2), the processing computer 3 (21-3), and the processing computer 2° (21-2'). Since the failure detection processing (S2201) can be realized by an existing method described below, it is not described herein. An example of the method of the failure detection processing includes a method for performing a life-or-death monitor of the computer by availability of network communication to each computer, and a method for performing the life-or-death monitor thereof when the management computer 20 refers to management information collected and notified by each processing computer.

When the management computer 20 detects the failure of the processing computer 21 by the failure detection processing (S2201) of the management computer 20, since the redundancy of the file stored in the information processing system 10 is highly possibly lost, the recovery processing of the data needs to be performed. To determine whether the recovery processing is necessary, the management computer 20 performs the data recovery determination processing (S2202).

In the data recovery determination processing (S2202) performed by the data recovery determination unit 600, it is checked whether the redundancy of each file stored in the processing computer 21 with which the failure has occurred, which is detected by failure detection processing, is not lost (S2201). When the redundancy is lost, the file whose redundancy is lost is recovered by another processing computer 21. According to the example of the sequence diagram, when the failure has occurred with the processing computer 2 (21-2), the data recovery determination unit 600 specifies that the processing computer 3 (21-3) retains the file lost due to the failure, and the file is transmitted from the processing computer 3 (21-3) to the processing computer 2' (21-2'). A specific procedure for recovering the file is included in an instruction of the data redundancy processing, an instruction of the data structure conversion, or an instruction of the data structure reverse-conversion. Details will be described below.

Figure 16:
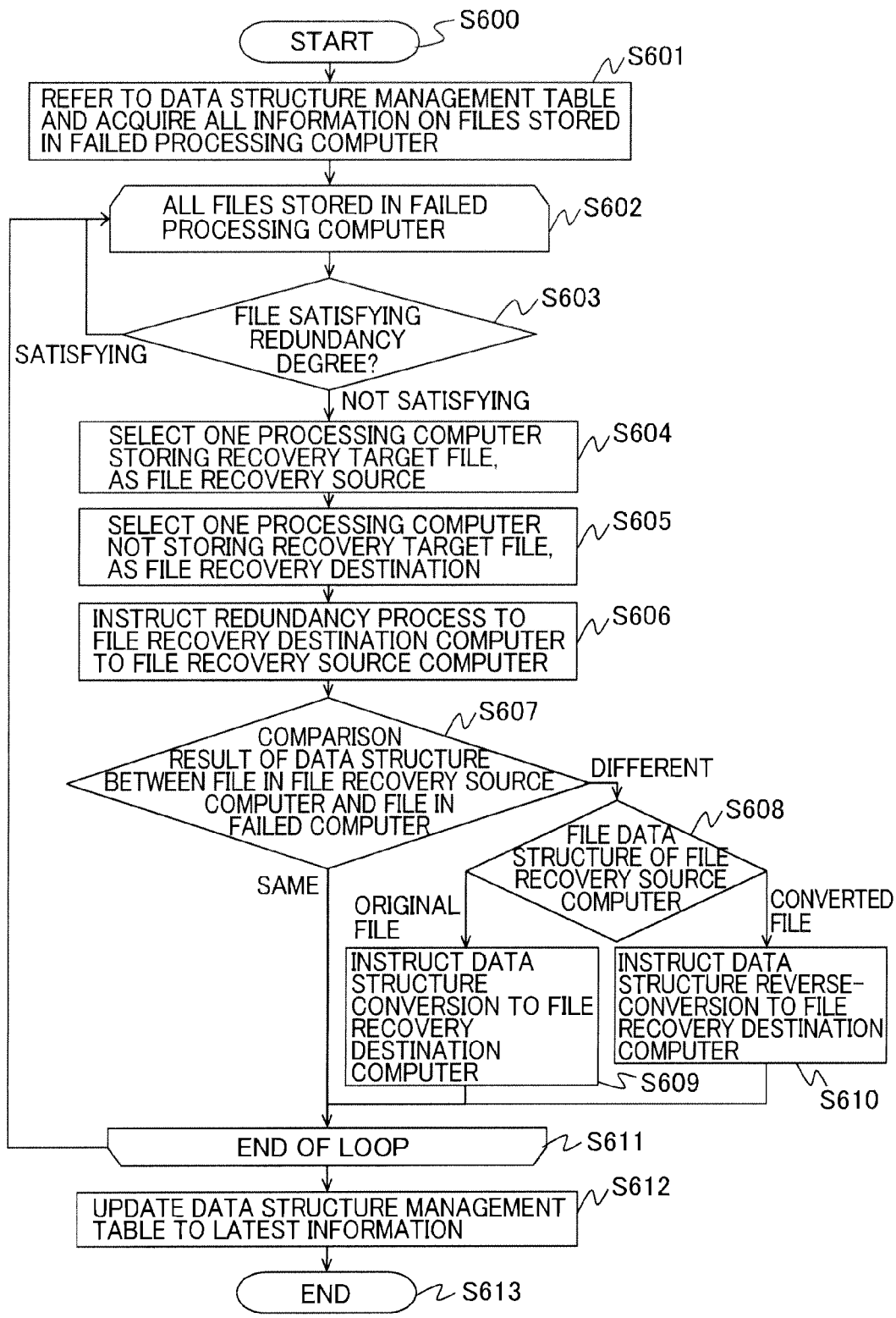
FIG. 16 is a flowchart illustrating a processing example of a data recovery determination unit 600.

Data recovery determination processing (S2202) performed by the data recovery determination unit 600 will be described below. FIG. 16 is a flowchart illustrating an example of the data recovery determination processing (S2202). In the data recovery determination processing (S2202), of all files stored in the processing computer 21 with which the failure has occurred, processing is performed for giving an instruction for recovering with another processing computer 21 on the file that does not satisfy the redundancy level 51 of the file in the policy definition file 50 illustrated in FIG. 3. Further, after the file is recovered, to adjust the retention ratio 52 of the data structure, processing is also performed for giving an instruction for performing the conversion or the reverse-conversion of the data structure. With reference to FIG. 16, the processing will be described below.

Upon start of the processing in step S600, in step S601, the data recovery determination unit 600 obtains all information about the file stored in the processing computer 21 with which the failure has occurred, with reference to the data structure management table 70 illustrated in FIG. 5. Processing of steps S602 to S611 is repeatedly performed on the all files whose information is obtained. In step S603, in a loop from step S602 to step S611, it is determined whether each file satisfies the redundancy level 51 of the file defined in FIG. 3. When it is determined that the redundancy level 51 is satisfied ("satisfying" in step S603), the data recovery determination unit 600 does not perform subsequent processing of the step S603, and returns to the processing in step S602. On the other hand, when it is determined that the redundancy level 51 is not satisfied ("not satisfying" in step S603), the data recovery determination unit 600 proceeds to the processing in step S604.

In step S604, for the file to be recovered, the data recovery determination unit 600 selects one computer as a computer of a recovery source from among the computers retaining both the original file and the converted file. When there is a plurality of computers to become a candidate, the computer is randomly selected. Further, in step S605, for the file to be recovered, from among the computers retaining none of the original file nor the converted file, one computer is selected as a computer of a recovery destination. In this case also, when there is a plurality of computers to become a candidate, the computer is randomly selected. In step S606, the data recovery determination unit 600 gives an instruction of the data redundancy processing of the file to be recovered to the recovery destination computer selected in step S605 to the recovery source computer selected in step S604. The data redundancy instruction corresponds to the data redundancy instruction illustrated in FIG. 15 (S2203). With the processing described above, the redundancy level 51 of the file to be recovered can be recovered to a state before the failure has occurred.

Further, in step S607, the data structure of the file stored in the computer with which the failure has occurred is compared with the data structure of the file copied in steps S604 to S606. As a result of the comparison, when it is determined that the data structure is the same ("same" in step S607), the data recovery determination unit 600 proceeds to processing in step S611. On the other hand, when it is determined that the data structure is different ("different in step S607), then in step S608, the data recovery determination unit 600 proceeds to processing of step S608 and checks the data structure of the file of the recovery source selected in step S604. When it is determined that the data structure of the file of the recovery source is the original file ("original file" in step S608), the data recovery determination unit 600 proceeds to processing step S609 and, in step S609, performs an instruction of the data structure conversion processing on the computer of the recovery destination selected in step S605. On the other hand, when it is determined that the data structure of the recovery source is the converted file ("converted file" in step S608), then in step S610, the data recovery determination unit 600 gives an instruction of the data structure reverse-conversion processing on the computer of the recovery destination selected in step 9605. With the processing described above, the retention ratio 52 of the data structure of the file to be recovered can be recovered to the state before the failure has occurred. When the processing computer 21 storing the data to be recovered in the same data structure as that retained in the processing computer 21 with which the failure has occurred, is selected as the recovery source computer, the data conversion processing at the recovery destination may not be performed. In this case, with reference to the data structure management table 70, the management computer 20 may select the processing computer 21 storing the data to be recovered in the same data structure as that of the data stored in the processing computer 21 with which the failure has occurred, as the recovery source computer.

After repeatedly performing from step S602 to step S611 on all files stored in the computer with which the failure has occurred, in step S612, the data recovery determination unit 600 updates information in the data structure management table 70 and, in step S613, ends the processing.

[Second Embodiment]

Next, a description will be given of the present invention according to a second embodiment thereof. In the present embodiment, there is shown an example of a system which can perform dynamic change of a retention ratio in an original file and a converted file by using statistics information of an analysis request.

In the first embodiment, a retention ratio 52 of the original file and the converted file is statically defined in the policy definition file 50 shown in FIG. 3, and the retention ratio 52 cannot be dynamically changed during the operation of the system. In the configuration described above, when a plurality of analysis requests is concentrated on any one of the original file and the converted file, the load of the processing computer 21 processing the analysis request is biased to the specific processing computer 21 depending on an initial definition of the retention ratio 52 of the original file and the converted file, and there is a problem that it is difficult to achieve improvement of an entire performance of the system 10. Consequently, the present embodiment records the statistics information about the analysis request, and realizes the dynamic retention ratio change of the data structure based on the recorded statistics information.

Figure 17:
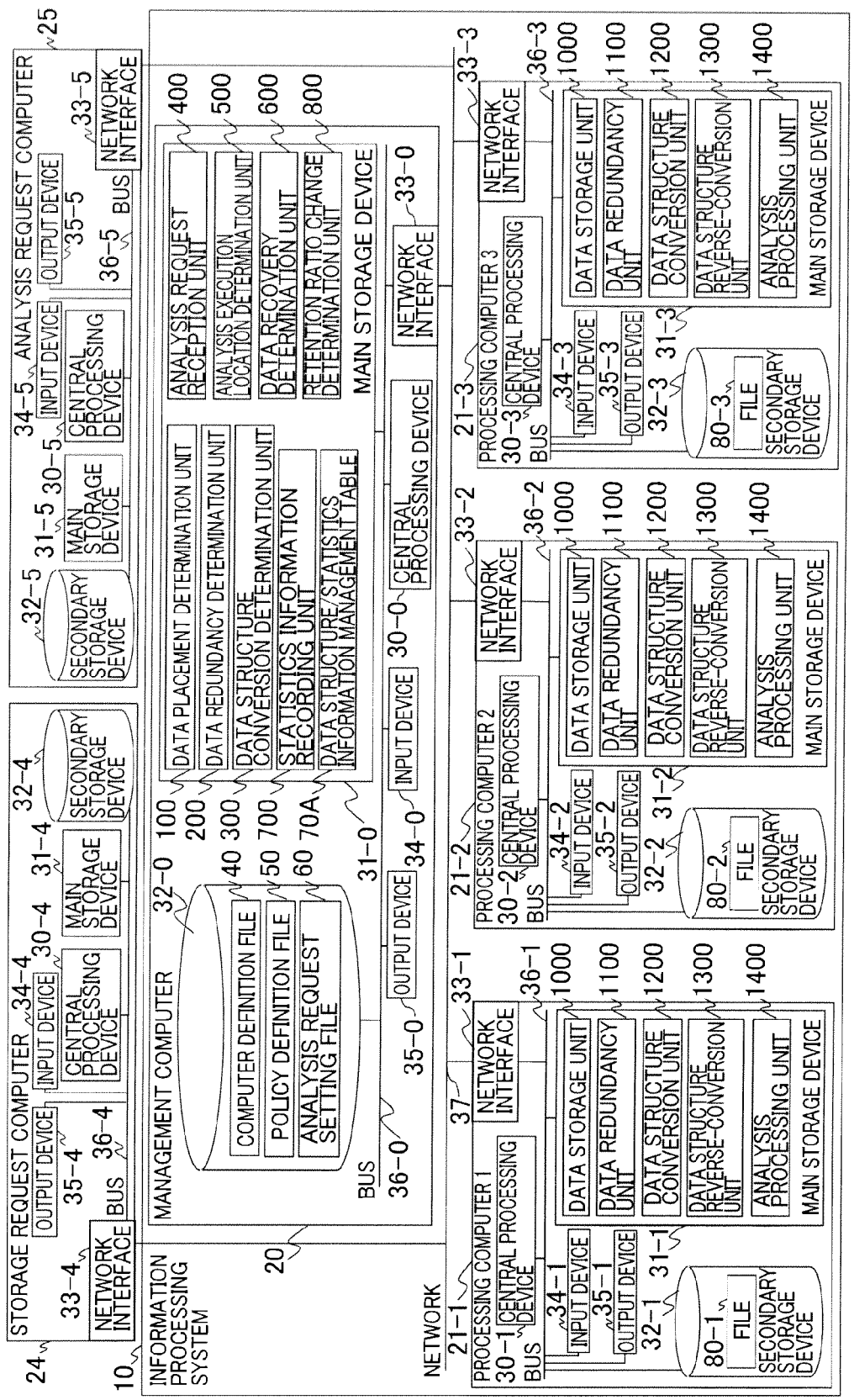
FIG. 17 is a configuration example of an information processing system 10 according to a second embodiment.

FIG. 17 shows a configuration example of the system 10 according to the second embodiment. In addition to the configuration of the information processing system 10 according to the first embodiment illustrated in FIG. 1, a statistics information recording unit 700 and a retention ratio change determination unit 800 are added to the management computer 20. Further, a data structure/statistics information management table 70A is added as a table which expands the data structure management table 70.

FIG. 18 shows a configuration example of the data structure/statistics information management table 70A. This is different from the data structure management table 70 shown in FIG. 5 in which fields (74-A to 74-C) recording a retention ratio of the current original file, converted file, and fields (75-A to 75-C) recording the number of references for each data structure in the analysis processing are added for each file.

Next, an example of what is meant in the data structure/statistics information management table 70A will be shown. A column 71-1 shows that the processing computer 1 retains the original file before conversion for the files A and C and the converted file after conversion for the file B. Further, a row 72-A shows that the processing computers 1 and 2 retain the file A as the original file before conversion, and shows that the processing computer 3 retains the file A as the converted file after conversion.

A column 74 of the fields 74-A to 74-C recording the retention ratio indicates retention ratios of the original file and the converted file for each file. For example, in the case of the row 72-A, since the file A is stored in the system in a state of two original files and one converted file, 2:1 is recorded in the cell 74-A. A column 75 of the fields 75-A to 75-C recording the number of references indicates the number of references to the original file and the number of references to the converted file for each file. For example, in the case of the row 72-A, 2:6 is recorded in the cell 75-A so as to show that for the file A, the original file is referred two times in total and the converted file is referred six times in total. In the number of references 75, the number of references during an operation period of the information processing system 10 is accumulated for each data structure so as to be recorded, but, the other recording mode may be employed, such as recording the number of references per a most recent unit time.

Next, an example of an updating method of the data structure/statistics information management table 70A is shown. First, the updating method of each of the items shown in the cells 73-A1 to 73-C3 is the same as the method shown in FIG. 5. Next, an updating method of the fields 74-A to 74-C recording the retention ratio counts up each of the number of original files and the number of converted files, in each of the corresponding rows, and records with a form (number of original files): (number of converted files) in the corresponding fields of 74-A to 74-C. An updating method of the fields 75-A to 75-C recording the number of references will be described later with reference to FIG. 20.

Figure 19:
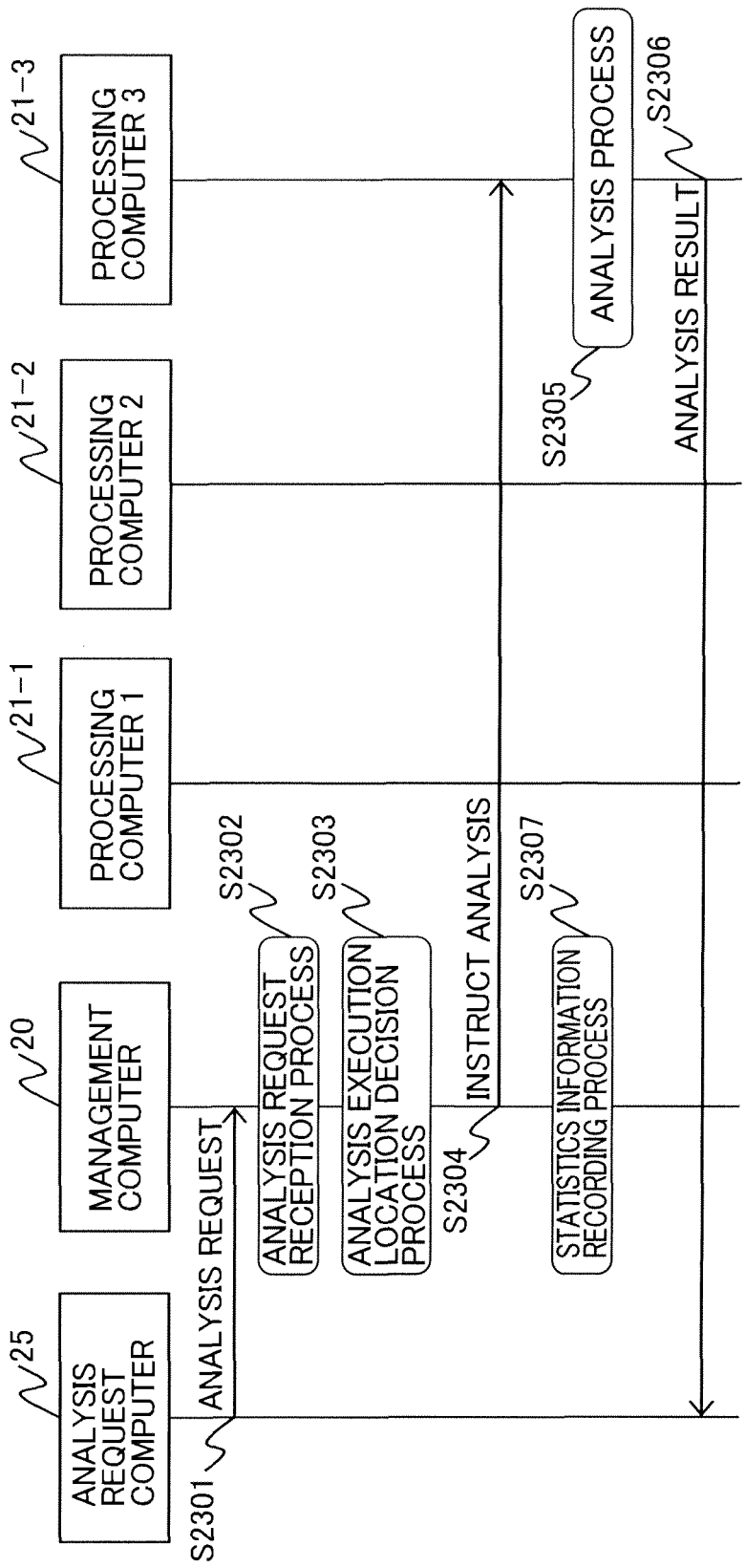
FIG. 19 is a sequential diagram illustrating a processing example when an analysis request is received according to a second embodiment.

FIG. 19 shows an example of a sequence diagram of the case that the analysis request computer 25 transmits the analysis request to the system 10 in the present embodiment. It is different from FIG. 13 shown in the first embodiment in which a statistics information recording processing S2307 is added as the processing of the management computer 20 after the analysis execution location determination processing S2303.

A description will be given of the sequence diagram on the basis of a specific example. Three processing computers are registered in the system 10, and files A, B and C are stored in a secondary storage device 32 of each of the processing computers 21 as shown in the data structure/statistics information management table 70A shown in FIG. 18. At this time, an analysis request S2301 is transmitted to the management computer 20 from the analysis request computer 25. Then, the management computer 20 performs an analysis request reception processing S2302 and the analysis execution location determination processing S2303, and determines to perform an analysis request S2304 by the processing computer 3 (21-3). Since the analysis request reception processing S2302 and the analysis execution location determination processing S2303 are the same as FIGS. 13 and 14 of the first embodiment, a description thereof will be omitted. Since the performing of the analysis processing by the processing computer 3 (21-3) is determined as a result of the analysis execution location determination processing S2303, the processing computer 3 (21-3) performs the analysis processing S2305. At this time, the management computer 20 performs a statistics information recording processing S2307, and performs processing for recording the performing of the analysis request transmitted from the analysis request computer 25 by the processing computer 3 (21-3) in the data structure/statistics information management table 70A shown in FIG. 18. Details of the statistics information recording processing S2307 will be described later.

Figure 20:
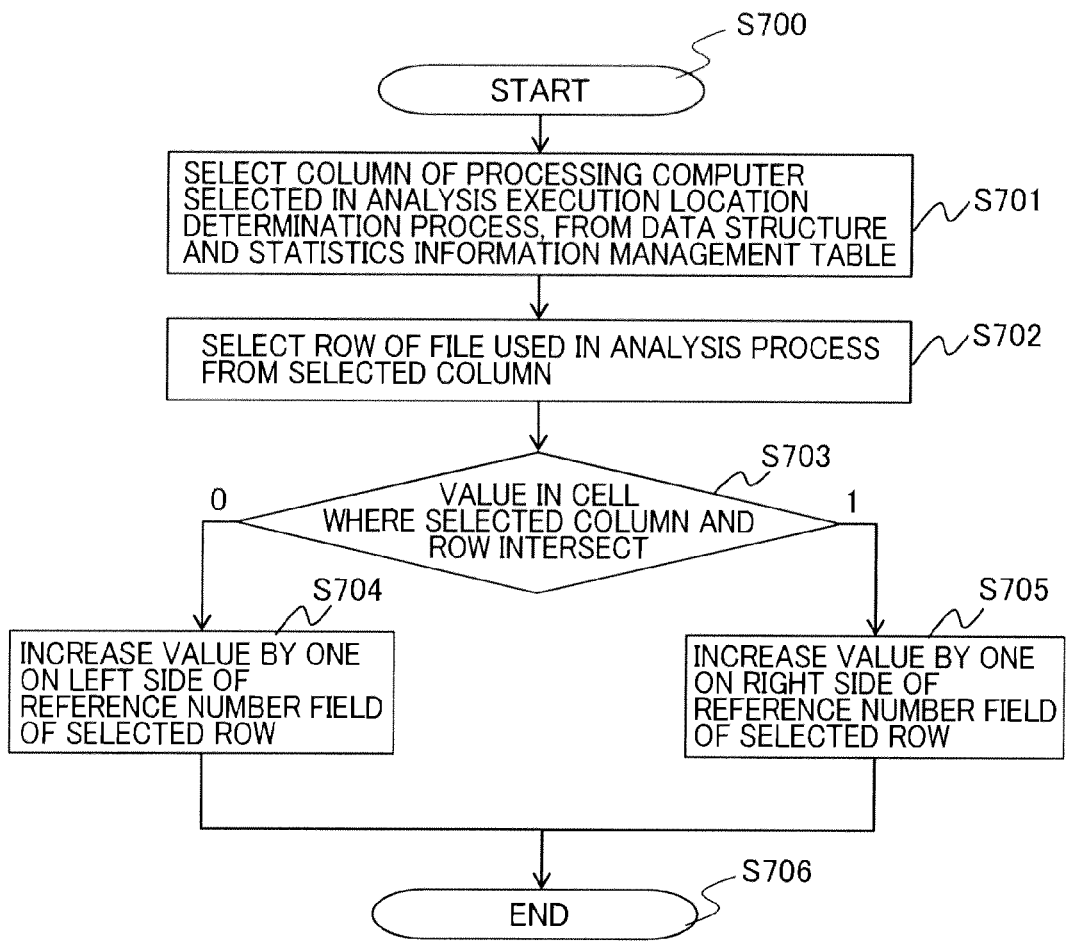
FIG. 20 is a flowchart illustrating a processing example of a statistics information recording unit 700.

Here, a description will be given of the statistics information recording processing S2307 which the statistics information recording unit 700 performs. FIG. 20 is a flow chart showing an example of the statistics information recording processing S2307. The statistics information recording unit 700 performs processing for updating the number of references field of the data structure/statistics information management table 70A on the basis of the processing computer 21 which is determined by the analysis execution location determination processing S2303 performed just before, and the file which is used in the analysis processing S2305. When the statistics information recording unit 700 starts the processing in S700, in S701, it first selects a column of the processing computer 21 which is selected by the analysis execution location determination processing S2303, on the basis of the data structure/statistics information management table 70A shown in FIG. 18. Next, in S702, it selects a row of the file which is used in the analysis request, from the selected column. Next, in S703, it confirms a value of a cell where the selected column and row intersect. When it is determined that the value of the cell is zero indicating the original file, the statistics information recording unit 700 proceeds to processing in S704 (S704, 0). On the other hand, when it is determined that the value of the cell is one indicating the converted file, the statistics information recording unit 700 proceeds to processing in S705 (S705, 1). When it proceeds to the processing in S704, the statistics information recording unit 700 increases a value on a left side of the number of references field of the selected row by one (S704). On the other hand, when it proceeds to the processing in S705, the statistics information recording unit 700 increases a value on a right side of the number of references field of the selected row by one (S705). The statistics information recording unit 700 finishes the processing in S706.

Figure 21:
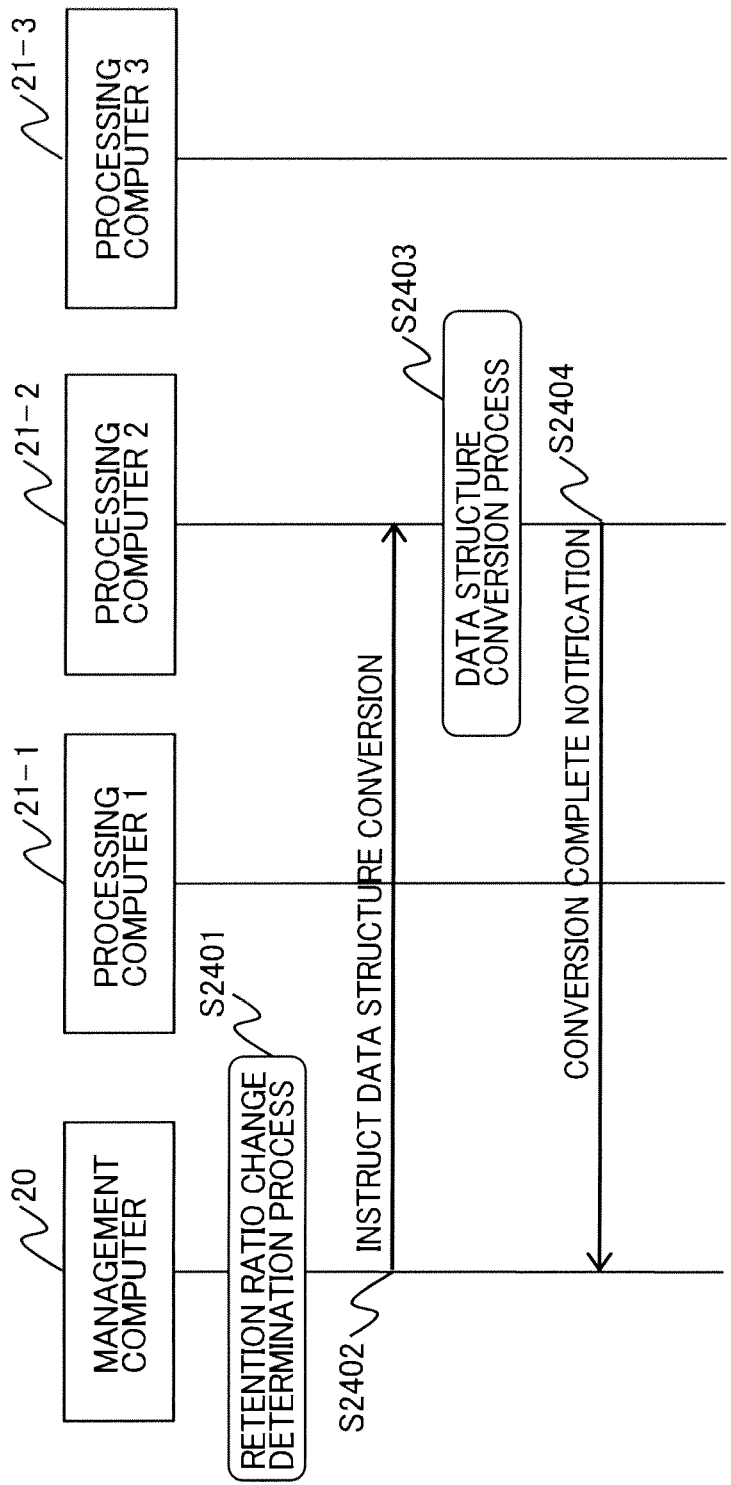
FIG. 21 is a sequential diagram illustrating a processing example when a retention ratio is changed according to the second embodiment.

Next, a description will be given of retention ratio change determination processing S2401 which a retention ratio change determination unit 800 performs. FIG. 21 shows an example of a sequence diagram in the case that the retention ratio of the data structure is changed for the file selected by the retention ratio change determination processing S2401. A timing at which the retention ratio change determination processing S2401 is performed can be optionally set. For example, a user can manually make the retention ratio change determination unit 800 perform, and a configuration that the management computer 20 makes the retention ratio change determination unit 800 periodically perform can be applied to the present invention. Details of the retention ratio change determination processing S2401 will be described later. Further, data structure conversion instruction S2402 and data structure conversion processing S2403 in the sequence diagram are only examples, and depending on determination of the retention ratio change determination processing S2401, there exist a case of data structure reverse-conversion instruction and data structure reverse-conversion processing.

A description will be given of the sequence diagram on the basis of a specific example. A case is considered where three processing computers 21 are registered in the system 10, and the retention ratio change determination processing S2401 determines to change the retention ratio for a certain file A. At this time, the file A is stored in each of the processing computers 1, 2 and 3 as shown in the 72-A row of the data structure/statistics information management table 70A shown in FIG. 18. Further, for the file A, it is assumed that the retention ratio between the original file and the converted file is 2:1 as described in 74-A, and the number of references of the original file and the converted file is 2:6 as described in 75-A.

As shown in FIG. 21, the management computer 20 first performs the retention ratio change determination processing S2401. Details of the retention ratio change determination processing S2401 will be described later, but, it is determined to change the current retention ratio of 2:1 to the new retention ratio of 1:2 which is the closest to the number of references of 2:6 as a result of the performing of the retention ratio change determination processing S2401, in the example of the sequence diagram. Further, in order to change the current retention ratio of 2:1 to the new retention ratio of 1:2, it is determined to instruct the original file of the file A stored in the processing computer 2 (21-2) to convert the data structure, and the data structure conversion instruction S2402 is transmitted to the processing computer 2 (21-2). In the processing computer 2 (21-2) having received the data structure conversion instruction S2402, the data structure conversion processing S2403 is performed on the original file of the file A specified by the data structure conversion instruction, and the converted file of the file A is obtained. The data structure conversion processing S2403 is the same as the processing shown in FIG. 11. The processing computer 2 (21-2) ends the processing by transmitting the conversion completion notification S2404 to the management computer 20 after completion of the data structure conversion processing S2403 for the original file of the file A. According to the above processing, the file A is changed from the state in which the retention ratio between the original file and the converted file is 2:1 to the state of the new retention ratio of 1:2 which is closer to the number of references of 2:6.

Figure 22:
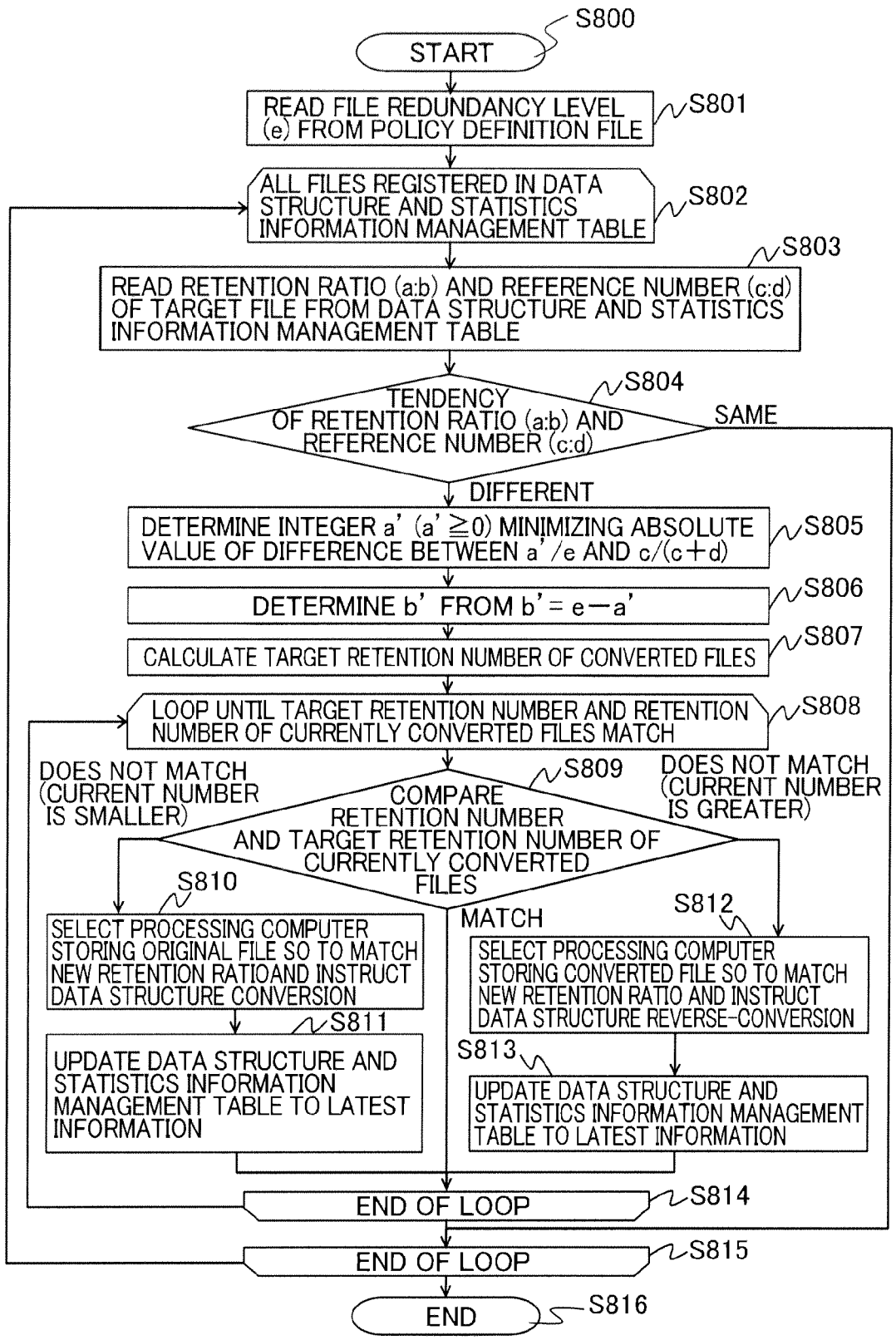
FIG. 22 is a flowchart illustrating a processing example of a retention ratio change determination unit 800.

Here, a description will be given of the retention ratio change determination processing S2401 which the retention ratio change determination unit 800 performs. FIG. 22 is a flow chart showing an example of the retention ratio change determination processing S2401. The retention ratio change determination unit 800 confirms whether or not the change of the ratio between the original file and the converted file is necessary for all the files stored in the system 10, and if it is necessary, the retention ratio change determination unit 800 performs the processing of changing the retention ratio between the original file and the converted file, by determining the new retention ratio and instructing the processing computer 21 to convert or reverse-convert the data structure. A description will be given below of the processing with reference to FIG. 22.

First, the retention ratio change determination unit 800 starts processing in S800, and reads a redundancy 51 of the file from the policy definition file 50 shown in FIG. 3 (S801). Hereinafter, the redundancy of the file is set to e. Next, it repeats S802 to S815 for all the files registered in the data structure/statistics information management table 70A shown in FIG. 18. Next, it reads the retention ratios (74-A to 74-C) and the number of references (75-A to 75-C) of each of the files from the data structure/statistics information management table 70A (S803). Hereinafter, it is assumed that the read retention ratio is a:b, and the read number of references is c:d.

In S804, the retention ratio change determination unit 800 determines whether or not the read retention ratio and the read number of references have the same tendency. An example of a specific determination method is as follows. In other words, if the difference between a value $a/(a+b)$ and a value $c/(c+d)$ is equal to or more than $1/(a+b)$, it determines that the retention ratio and the number of references have different tendencies. On the other hand, if the difference is less than $1/(a+b)$, it determines that the retention ratio and the number of references have the same tendency. The method of determining the tendency of the retention ratio and the number of references shown in the above description is only an example, and is not limited to this.

In S804, if it is determined that the retention ratio and the number of references have the same tendency (same in S804), the retention ratio change determination unit 800 skips the processing to a loop termination (S815). On the other hand, if it is determined that the retention ratio and the number of references have the different tendencies (different in S804), the retention ratio change determination unit 800 proceeds to processing in S805.

The retention ratio change determination unit 800 determines the new retention ratio which is close to the number of references of c:d (S805, S806). Here, an example of a method of determining the new retention ratio is listed up. In other words, the new retention ratio to be determined in the future is set to a':b' (a' and b° are integral numbers which are not negative). At this time, the non-negative integer a' in which an absolute value of a difference between $a'/e$ and $c/(c+d)$ is minimum is calculated. Next, $b'=e-a'$ is calculated. The new retention ratio of a':b' can be determined by the above. The determining method listed above is only an example, and the determining method is not limited to this.

According to the example of the determining method described above, for example, if the redundancy (e) of the file is 3, the retention ratio of (a:b) of the original file and the converted file is 2:1, and the number of references of (c:d) is 1:2, the new retention ratio of a':b' is 1:2.

Next, in S807, the retention ratio change determination unit 800 calculates a target retention number of the converted file. The target retention number here is the same as b' which is calculated in S806. Next, the retention ratio change determination unit 800 repeats the processing from S808 to S814 until the retention number of the current converted file corresponds to the target retention number calculated in S807, with reference to the data structure/statistics information management table 70A shown in FIG. 18. In S809, if the retention ratio change determination unit 800 determines that the retention number of the current converted file does not corresponds to the target retention number calculated in S807, it continuously compares the retention number of the current converted file with the target retention number. If it determines that the retention number of the current converted file is smaller (current is smaller in S809), as a result of the comparison in S809, the retention ratio change determination unit 800 performs the data structure conversion processing from the original file to the converted file (S810). Specifically, it selects in a random order the target computer among the processing computers 21 storing the original file so as to obtain the newly determined retention ratio, and transmits the data structure conversion instruction. It thereafter updates the data structure/statistics information management table 70A to the most recent information in S811, and returns to the processing in S808 until the retention number of the current converted file corresponds to the target retention number.

On the other hand, when the retention ratio change determination unit 800 determines that the retention number of the current converted file is larger (current is larger in S809), as a result of the comparison in S809, in S812, it performs the data structure reverse-conversion processing from the converted file to the original file. Specifically, it selects in a random order the target computer among the processing computers 21 storing the converted file so as to obtain the newly determined retention ratio, and transmits the reverse-conversion instruction of the data structure. In S813, it thereafter updates the data structure/statistics information management table 70A to the most recent information, and returns to the processing in S808 until the retention number of the current converted file corresponds to the target retention number. When the retention number of the current converted file corresponds to the target retention number, it finishes the processing (S816).

[Third Embodiment]

Next, a description will be given of a third embodiment according to the present invention. The present embodiment shows an example of a system which can perform efficient dynamic retention ratio changes of the original file and the converted file, by using statistics information of an analysis request and load information of each of the processing computers.

The second embodiment proposes a configuration which realizes the dynamic retention ratio changes of the original file and the converted file on the basis of the statistics information, by the statistics information recording unit 700, the retention ratio change determination unit 800, and the data structure/statistics information management table 70A. The present embodiment realizes the more efficient retention ratio change by dynamic retention ratio change while using the load information of each of the computers, at the time of dynamic retention ratio change in the second embodiment. Further, the present embodiment employs a method of copying from the processing computer 21 which already retains the file of the converted form, as a new method of the conversion processing and the reverse-conversion processing of the data structure.

Figure 23:
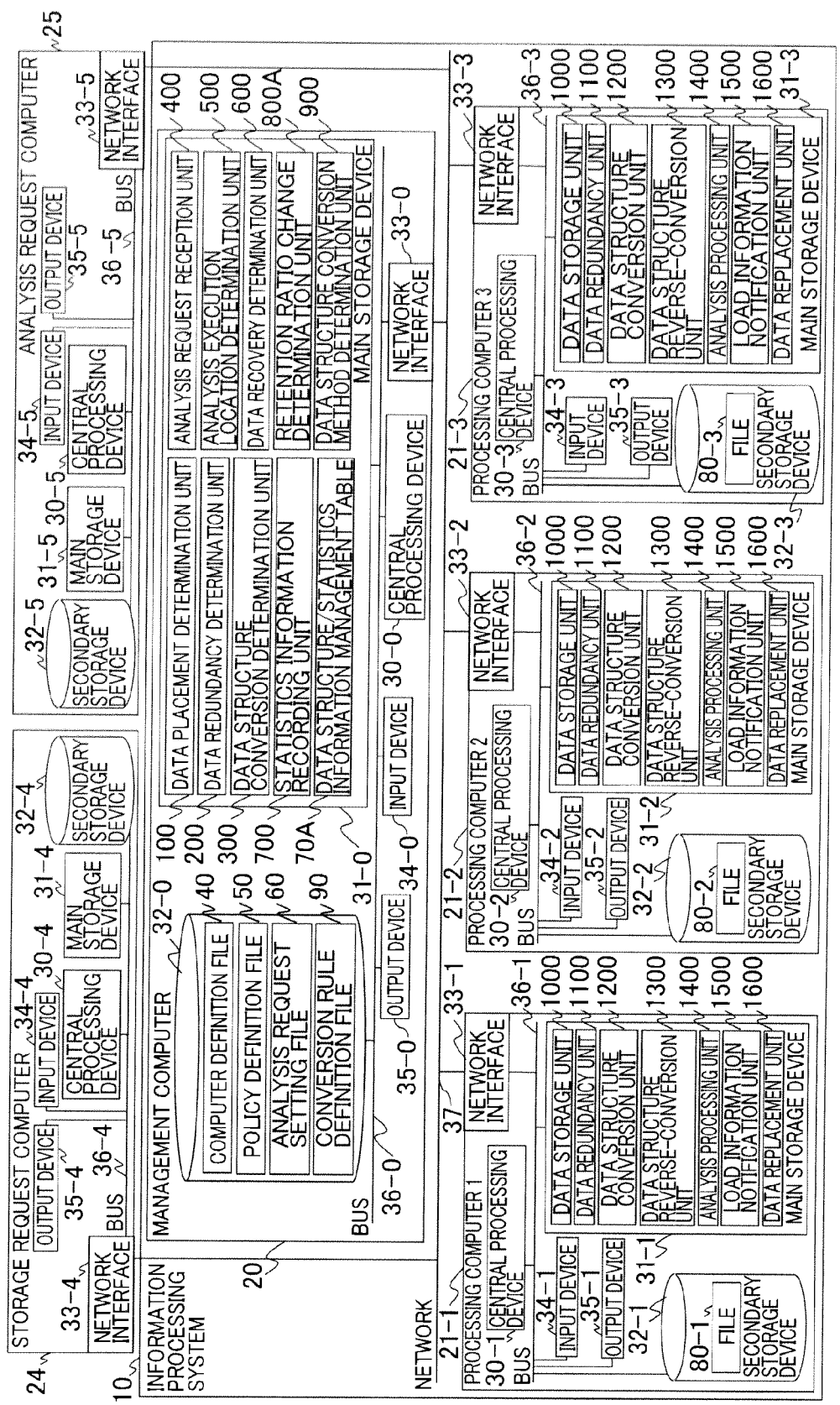
FIG. 23 is a configuration example of the information processing system 10 according to a third embodiment.

FIG. 23 is a view showing a configuration example of the system 10 according to the third embodiment. In comparison with the configuration according to the second embodiment illustrated in FIG. 17, the present embodiment is different in which a retention ratio change determination unit 800A and a data structure conversion method determination unit 900 according to the third embodiment are added to the main storage device 31-0 of the management computer 20. Further, a conversion rule definition file 90 is added to the secondary storage device 32-0 of the management computer 20. In addition, a load information notification unit 1500 and a data replacement unit 1600 are added to each of the processing computers (21-1 to 21-3).

Figure 24:
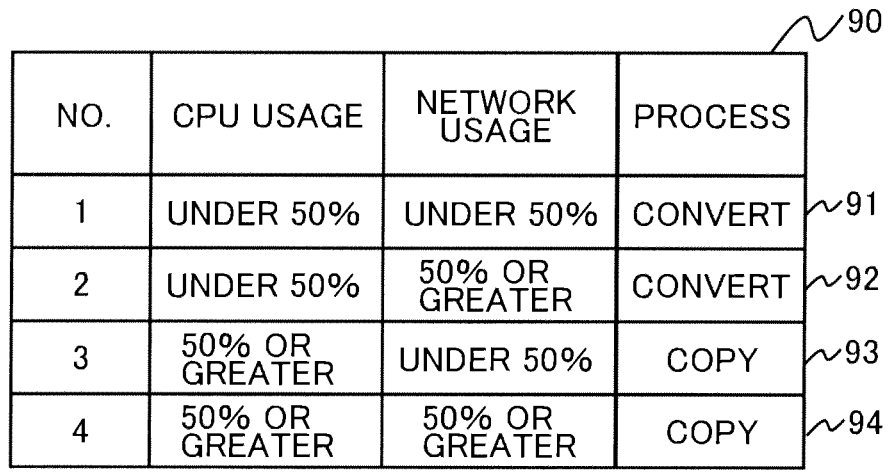
FIG. 24 is a configuration example of a conversion rule definition file 90.

FIG. 24 is an example of the conversion definition file 90 shown in FIG. 23. The conversion rule definition file 90 is a file which defines a condition of a threshold value of the load information such as a CPU usage rate of the processing computer 21 and a network usage rate, and processing in the case of satisfying all the conditions. In the definition example in the present embodiment, the condition of the threshold value is defined about the CPU usage rate and the network usage rate, and the processing (91 to 94) to be performed in the case of satisfying both is described. In the example in FIG. 24, in the case that the CPU usage rate of the processing computer 21 is as high as equal to or more than 50%, it is set so as to perform a copy processing from the processing computer 21 which has already retained the corresponding file in place of the data conversion processing in each of the processing computers 21 for reducing the load of each of the processing computers 21. The value shown as the definition example is only an example, and can be more finely defined. Further, the CPU usage rate and the network usage rate are defined as the condition, but, the condition is not limited to them, but can be defined by the other load information of the processing computer 21 than them.

Figure 25:
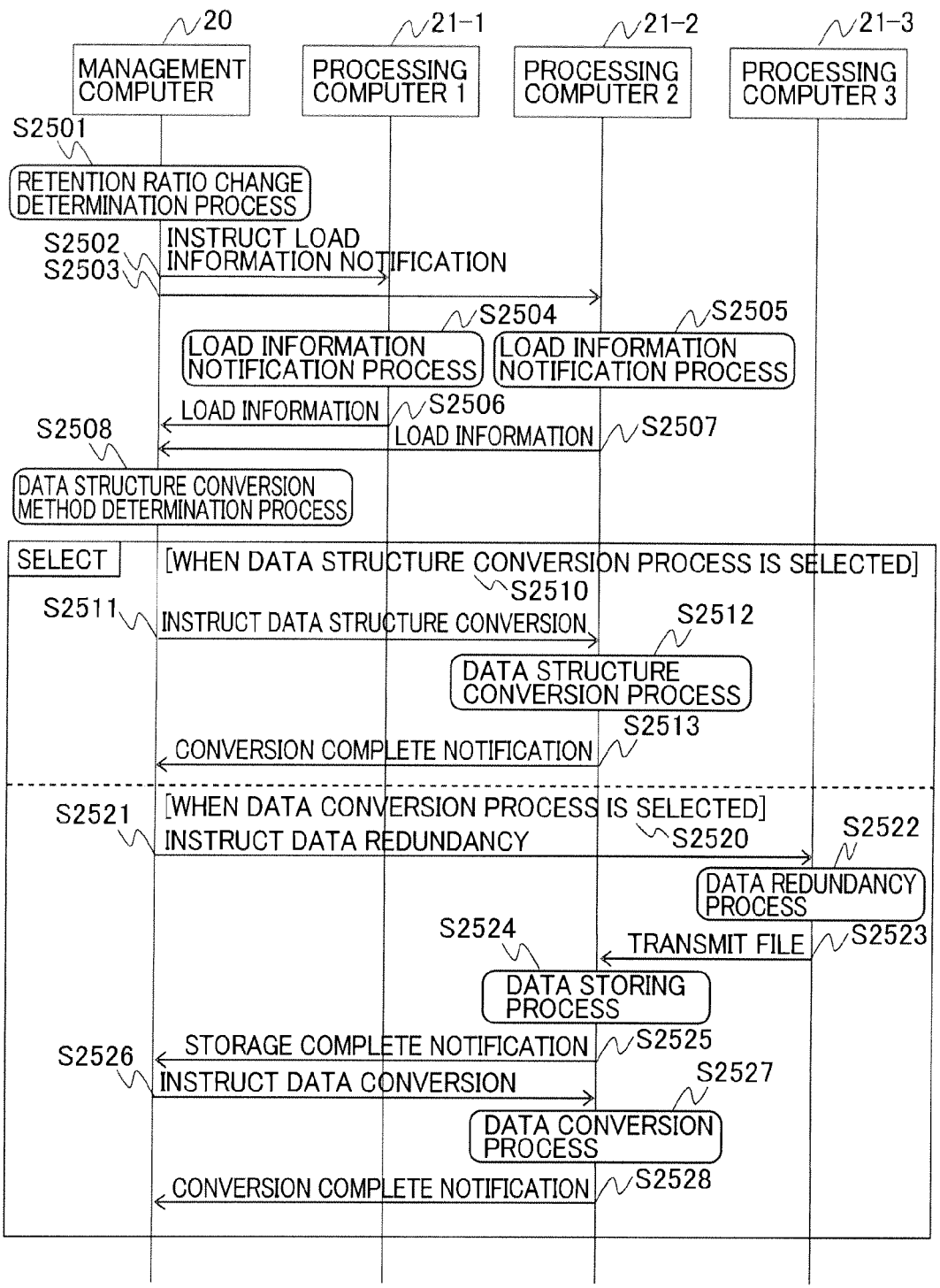
FIG. 25 is a sequential diagram illustrating a processing example when a retention ratio is changed according to the third embodiment.

FIG. 25 is an example of a sequence diagram of the case (S2510) that the retention ratio change determination unit 800A and the data structure conversion method determination unit 900 according to the present embodiment respectively perform retention ratio change determination processing S2501 and data structure conversion method determination processing S2508, and instruct to perform data structure conversion processing S2512, and the case (S2520) of instructing to perform data replacement processing S2527. Which of the data structure conversion processing S2512 and the data replacement processing S2527 is instructed to be performed is determined by the data structure conversion method determination processing S2508, but, details thereof will be described later. The data structure conversion instruction S2511 and the data structure conversion processing S2512 in the sequence diagram are only examples, and there exists the case of data structure reverse-conversion instruction and data structure reverse-conversion processing depending on the determination of the retention ratio change determination processing S2501 and the data structure conversion method determination processing S2508. Details of the retention ratio change determination processing S2501, the data structure conversion method determination processing S2508 and the load information notification processing S2504 to S2505 will be described later. Further, since the data structure conversion processing S2512 is the same processing as FIG. 11, a description thereof will be omitted.

A description will be given of the processing illustrated in the sequence diagram in FIG. 25 on the basis of a specific example. The specific example assumes the case that three processing computers 21 are registered in the system 10, and the retention ratio change determination processing S2501 determines the retention ratio change for a certain file A. At this time, as shown in the 72-A row of the data structure/statistics information management table 70A shown in FIG. 18, the original file of the file A is stored in the processing computers 1 and 2, and the converted file is stored in the processing computer 3, respectively. Further, in the file A, it is assumed that the retention ratio between the original file and the converted file is 2:1 described in the cell 74-A in FIG. 18, and the number of references between the original file and the converted file is 2:6 described in the cell 75-A in FIG. 18.

First, the management computer 20 performs the retention ratio change determination processing S2501. Details of the retention ratio change determination processing S2501 according to the present embodiment will be described later, but, in the example of the sequence diagram in FIG. 23, it is determined to change the current retention ratio 2:1 to the new retention ratio 1:2 which is the closest to the number of references 2:6, as a result of the performing of the retention ratio change determination processing S2501. Further, in order to change the current retention ratio 2:1 to the new retention ratio 1:2, the management computer 20 transmits the load information notification instructions S2502 to S2503 to the processing computer 1 (2101) and the processing computer 2 (21-2). At this time, a file to be processed by the retention ratio change determination processing S2501 is hereinafter called as a target file. The processing computer 1 (21-1) and the processing computer 2 (21-2) receiving the load information notification instructions S2502 to S2503 perform the load information notification processing S2504 to S2505, and transmit the load information S2506 to S2507 to the management computer 20. For example, the information of the CPU usage rate and the network usage rate which are described above can be included as the load information.

The management computer 20 performs the data structure conversion method determination processing S2508 after receiving the load information S2506 to S2507 of the processing computer 1 (21-1) and the processing computer 2 (21-2). Details of the data structure conversion method determination processing S2508 will be described later, but, the data structure conversion method determination processing S2508 can be separated into two patterns including a case (S2510) that it selects the data structure conversion processing and a case (S2520) that it selects the data replacement processing. A description will be given later of each of the patterns while separating the cases.

First, a description will be given of the case that the data structure conversion processing is selected in the data structure conversion method determination processing S2508. As a result of the data structure conversion method determination processing S2508, the processing computer 2 (21-2) determines to perform the data structure conversion processing, and the retention ratio change determination unit 800 transmits the data structure conversion instruction S2511 for the original file of the target file, to the processing computer 2 (21-2). The processing computer 2 (21-2) performs the data structure conversion processing S2512 for the original file of the target file after receiving the data structure conversion instruction S2511, and converts the original file of the target file into the converted file. After the conversion, the processing computer 2 (21-2) transmits the conversion completion notification S2513 to the management computer 20 and finishes the processing. According to the processing described above, the retention ratio between the original file A and the converted file a is changed from the state of 2:1 to the state of the new retention ratio 1:2 which is closer to the number of references 2:6.

Next, a description will be given of a case that the data replacement processing is selected in the data structure conversion method determination processing (S2508). As a result of the data structure conversion method determination processing S2508, it is determined to perform the data replacement processing between the processing computer 3 (21-3) and the processing computer 2 (21-2), and the management computer 20 transmits the data redundancy instruction S2521 to the processing computer 3 (21-3) so as to make the target file redundant in relation to the processing computer 2 (21-2). The processing computer 3 (21-3) performs the data redundancy processing S2522 in relation to the stored target file after receiving the data redundancy instruction S2521 of the target file, and transmits the converted file of the target file to the processing computer 2 (21-2) (S2523). The processing computer 2 (21-2) receiving the converted file from the processing computer 3 (21-3) performs the data storage processing S2524, stores the received converted file in the secondary storage device (32-2), and transmits a storage finish notification S2525 to the management computer 20.

The management computer 20 transmits a data replacement instruction S2526 about the converted file received from the processing computer 3 (21-3) and the original file which the processing computer 2 (21-2) originally retains, to the processing computer 2 (21-2) after receiving the storage finish notification S2525. The processing computer 2 (21-2) having received the data replacement instruction S2526 performs data replacement processing S2527 for the converted file and the original file, overwrites the original file which is originally retained in the secondary storage device (32-2) of the processing computer 2 (21-2) and is a subject to be replaced, by the converted file received from the processing computer 3 (22-3), and transmits a replacement finish notification S2528 to the management computer 20. According to the above processing, the retention ratio between the original file and the converted file is changed from the state 2:1 to the new retention ratio state 1:2 which is closer to the number of references 2:6.

Figure 26:
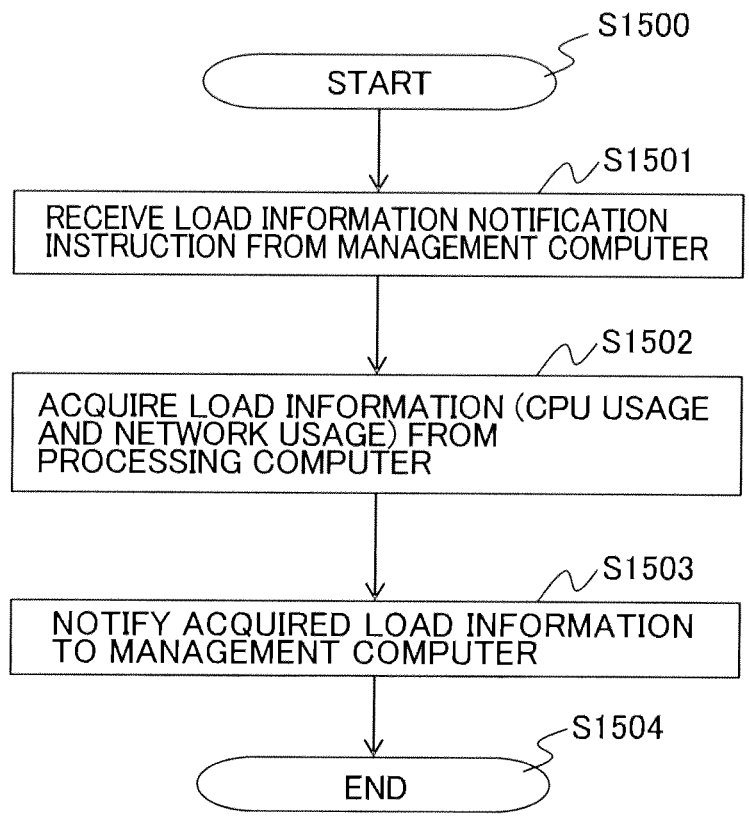
FIG. 26 is a flowchart illustrating a processing example of a load information notification unit 1500.

Next, a description will be given of a load information notification processing which the load information notification unit 1500 performs. FIG. 26 is a flow chart showing an example of the load information notification processing. In the load information notification processing, the processing computer 21 notifies the management computer 20 of the load information of the processing computer 21 in which the load information notification unit 1500 is performed, in response to a request from the management computer 20.

When starting the processing in S1500, the load information notification unit 1500 receives the load information notification instruction from the management computer 20 (S1501), and acquires the load information of the processing computer 21 (S1502). In the load information of the processing computer 21, for example, a disc usage rate can be included, in addition to the CPU usage rate and the network usage rate, but, load information is not limited to them. The load information notification unit 1500 notifies the management computer of the acquired load information (S1503) after acquiring the load information of the processing computer 21, and finishes the processing (S1504)

Figure 27:
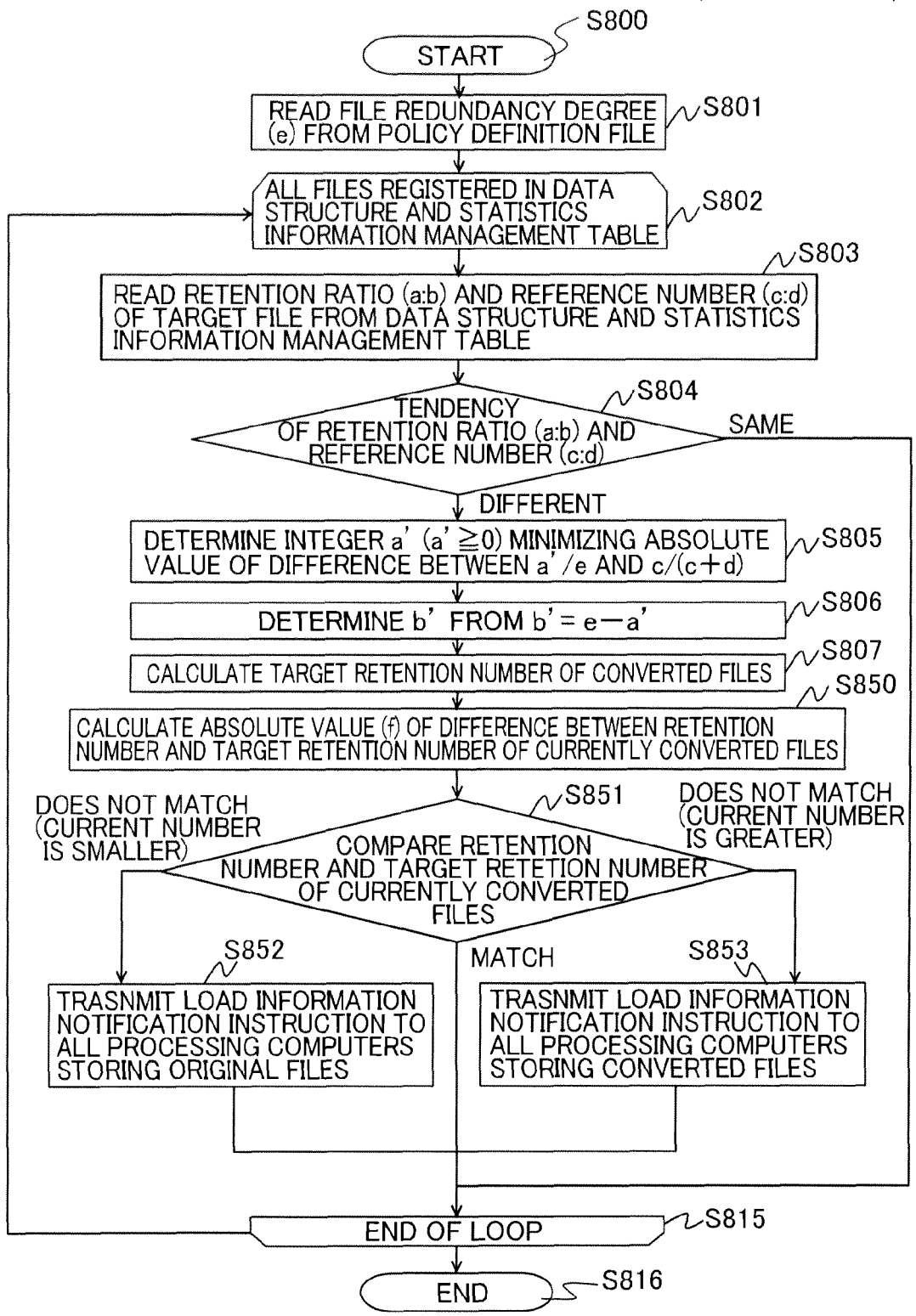
FIG. 27 is a flowchart illustrating a processing example of a retention ratio change determination unit 800 according to the third embodiment.

Next, a description will be given of the retention ratio change determination processing S2504 to S2505 which the retention ratio change determination unit 800A performs. FIG. 27 is a flow chart showing an example of the retention ratio change determination processing S2504 to S2505. In comparison with the retention ratio change determining unit 800 according to the second embodiment, the retention ratio change determination unit 800A according to the present embodiment is different in which it transmits the load information notification instruction to the processing computer 21. In comparison with the flow chart of the retention ratio change determination processing S2401 in the second embodiment shown in FIG. 22, it is different in the processing of S850 to S853 transmitting the load information notification instruction to the processing computer 21 which stores the original file to be applied the data structure conversion processing, or the processing computer 21 which stores the converted file to be applied the data structure reverse-conversion processing, after S807 calculating the target retention number of the converted file. Hereinafter, a description will be given only of the different portion from FIG. 22.

The retention ratio change determination unit 800A calculates the target retention number of the converted file (S807), and thereafter calculates an absolute value f of a difference between the retention number of the current converted file and the target retention number (S850). Taking the file A in the 72-A row of the data structure/statistics information management table 70A shown in FIG. 18 as an example, the retention number of the current converted file is 1, and the target retention number is 2 on the basis of the result of S805 to S807. Therefore, f calculated in S850 is 1. Next, the retention number of the current converted file is compared with the target retention number (S851). In the case of determining that the retention number of the current converted file coincides with the target retention number, the retention ratio change determination unit 800A proceeds to the processing of S815 (coincidence in S851). In the case of determining that the retention number of the current converted file is smaller (current is smaller in S851), the retention ratio change determination unit 800A refers to the data structure, statistic information management table 70A shown in FIG. 18, and transmits the load information notification instruction to all the processing computers 21 which store the original file (S852). In the case of determining that the retention number of the current converted file is larger (current is larger in S851), the retention ratio change determination unit 800A refers to the data structure/statistics information management table 70A shown in FIG. 18, and transmits the load information notification instruction to all the processing computers 21 which store the converted file (S853). The load information of each of the processing computers 21 returned in response to the load information notification instruction transmitted here, and the absolute value f of the difference between the retention number of the current converted file and the target retention number calculated in S850 are utilized in the data structure conversion method determination processing in FIG. 28.

Figure 28:
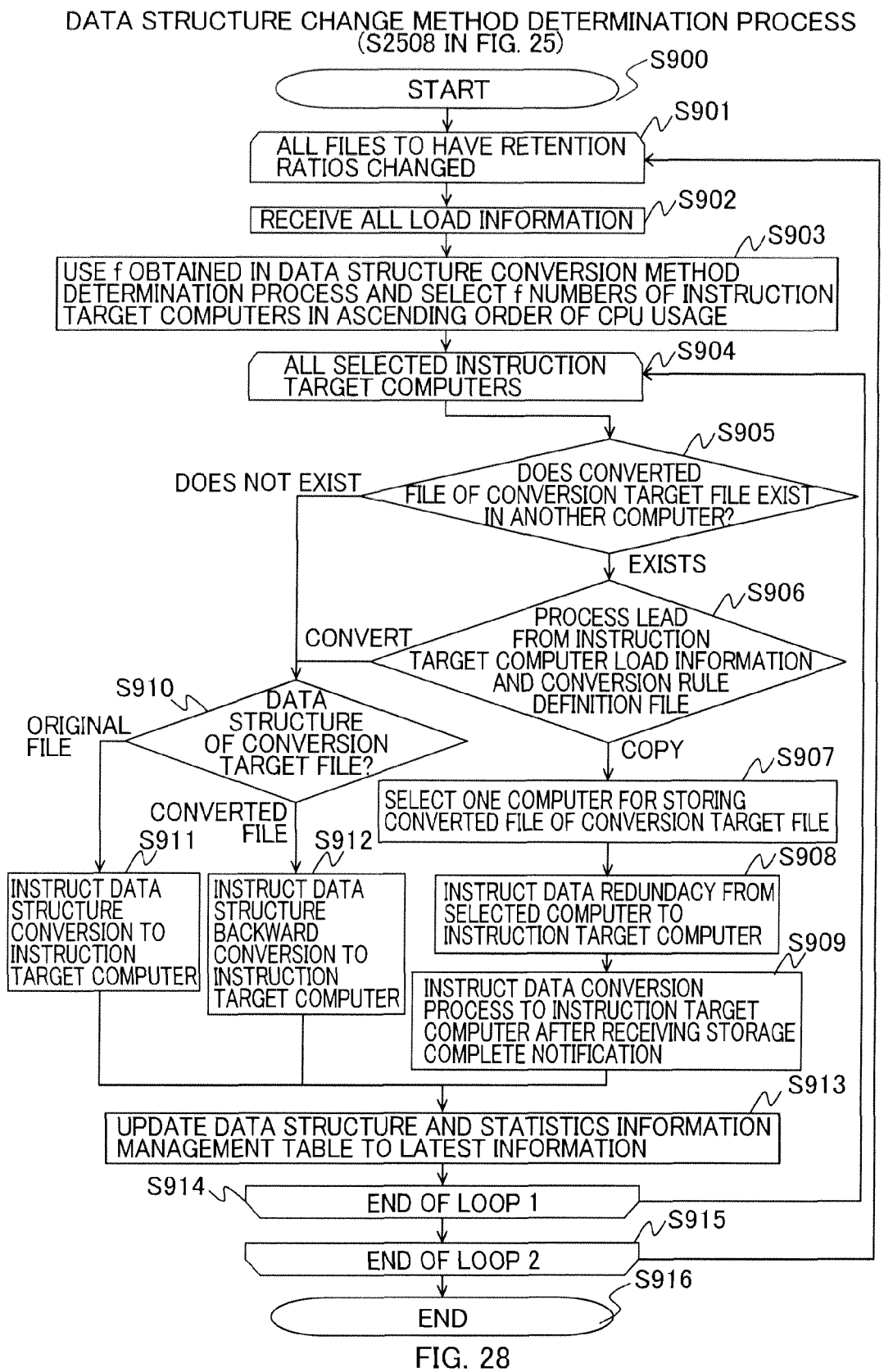
FIG. 28 is a flowchart illustrating a processing example of a data structure conversion method determination unit 900.

Next, a description will be given of the data structure conversion method determination processing S2508 which the data structure conversion method determination unit 900 performs. FIG. 28 is a flow chart showing an example of the data structure conversion method determination processing S2508. The data structure conversion method determination unit 900 selects and determines a method which efficiently performs the retention ratio change of the data structure of the file among the processing computers 21 which instruct all the files determined in S802 to S815 to give notification of the load information in any of S852 and S853, in the retention ratio change determination unit 800A according to the present embodiment shown in FIG. 27, and instructs of the method. A description will be given below of the processing by using FIG. 28.

The data structure conversion method determination unit 900 repeats the steps S901 to S915, for all the files on which the retention ratio change determined by the retention ratio change determination unit 800A according to the present embodiment shown in FIG. 27 is performed. First, in S902, when starting the processing in S900, the data structure conversion method determination unit 900 receives all the load information which the retention ratio change determination unit 800A has instructed each of the processing computers 21, for the file on which the retention ratio change is performed. The load information received in S902 corresponds to the load information S2506 to S2507 in FIG. 25.

Next, in S903, f number of processing computers 21 are selected in the order from the lowest CPU usage rate, by using the value of f which is determined in S850 of the retention ratio change processing shown in FIG. 27, and the information of the CPU usage rate included in the load information of the processing computer 21 received in S902. The computer selected here is called an instruction target computer, and the original file or the converted file which is stored therein and is the conversion target is called a conversion target file. Further, a file obtained by applying the data structure conversion processing or the data structure reverse-conversion processing to the conversion target file is called an post-conversion file. Specifically, if the conversion target file is the original file, the post-conversion file is the converted file, and if the conversion target file is the converted file, the post-conversion file is the original file.

The data structure conversion method determination unit 900 repeats S904 to S914 for all the instruction target computers. First, in S905, for the conversion target file stored in the instruction target computer, it checks whether or not the post-conversion file is stored in the other computers. The check in S905 can be performed by referring to the data structure/statistics information management table 70A shown in FIG. 18. In the case of determining that the post-conversion file is stored in the other computers than the instruction target computer, the data structure conversion method determination unit 900 proceeds to the processing in S906 (existing in S905). On the other hand, in the case of determining that the post-conversion file is not stored in the other computers than the instruction target computer, the data structure conversion method determination unit 900 proceeds to the processing in S910 (not existing in S905).

The data structure conversion method determination unit 900 derives the processing 91 to 94 in S906 on the basis of the load information of the instruction target computer acquired in S902 and the conversion rule definition file 90 shown in FIG. 24. If the derived processing is "conversion", the data structure conversion method determination unit 900 proceeds to the processing in S910 (conversion in S906). On the other hand, if the derived processing is "copy", the data structure conversion method determination unit 900 proceeds to the processing in S907 (copy in S906).

At the beginning, a description will be given of the processing S910 to S912 performed in the case that the processing derived in the determination in S906 is "conversion". The processing flow here corresponds to S2510 to S2513 in FIG. 25. First, in S910, the data structure conversion method determination unit 900 confirms the data structure of the conversion target file. In the case of determining that the data structure of the conversion target file is the original file (original file in S910), the data structure conversion method determination unit 900 instructs the instruction target computer to convert the data structure for converting the data structure of the conversion target file from the original file to the converted file (S911). On the other hand, in the case of determining that the data structure of the conversion target file is the converted file (converted file in S910), the data structure conversion method determination unit 900 instructs the instruction target computer to reverse-convert the data structure for converting the data structure of the conversion target file from the converted file to the original file (S912). FIG. 25 illustrates the processing in the case of outputting the conversion instruction of the data structure, and the data structure conversion instruction in S911 corresponds to S2511 in FIG. 25. After outputting any instruction in S911 and S912, the data structure conversion method determination unit 900 proceeds to the processing in S913.

Next, a description will be given of the processing S907 to S909 performed in the case that the processing derived by the determination in S906 is "copy". The processing flow here corresponds to S2520 to S2528 in FIG. 25. First, in S907, the data structure conversion method determination unit 900 selects one computer which stores the post-conversion file of the conversion target file checked in S905. Next, in S908, the data structure conversion method determination unit 900 instructs the selected computer to perform data redundancy toward the instruction target computer. The data redundancy instruction here corresponds to S2521 in FIG. 25. The processing computer having received the data redundancy instruction transmits the post-conversion file of the conversion target file toward the instruction target computer. The instruction target computer having received the post-conversion file of the conversion target file performs the data storage processing, and transmits the storage completion notification to the management computer. In S909, the management computer receives the storage completion notification, and thereafter gives instruction of the data replacement processing to the instruction target computer. The data replacement instruction here corresponds to S2526 in FIG. 25. Thereafter, the processing proceeds to S913.

The data structure conversion method determination unit 900 ends the processing in S907 to S909 or S910 to S912, and thereafter updates the recorded contents of the data structure/statistics information management table 70A by the most recent information (S913). Thereafter, the processing returns to S904 and S901, repeats the processing loop under a predetermined condition (S914, S915), and thereafter ends the processing (S916).

According to the third embodiment of the present invention described above, the retention ratio of the original file and the converted file can be dynamically changed for further improving the data processing efficiency of the system 10, by using the statistics information of the analysis request and the load information of each of the processing computers.

According to the present invention described according to the present embodiments described above, there can be provided the information processing system and the information processing method which can perform the analysis of the semi-structured data at a high speed while maintaining the fault tolerance of the data without having any extra data within the information processing system.

The description is specifically given on the basis of the present embodiments, but, the present invention is not limited to the present embodiments described above, but can be variously changed within a range which does not deflect from the scope.

REFERENCE SIGNS LIST

10 Information processing system
20 Management computer

21 Processing computer
24 Storage request computer
25 Analysis request computer
40 Computer definition file
50 Policy definition file
60 Analysis request setting file
70 Data structure management table
70A Data structure/statistics information management table
80 File
90 Conversion rule definition file
100 Data placement determination unit
200 Data redundancy determination unit
300 Data structure conversion determination unit
400 Analysis request reception unit
500 Analysis execution location determination unit
600 Data recovery determination unit
700 Statistics information recording unit
800 Retention ratio change determination unit
800A Retention ratio change determination unit
900 Data structure conversion method determination unit
1000 Data storage unit
1100 Data redundancy unit
1200 Data structure conversion unit
1300 Data structure reverse-conversion unit
1400 Analysis processing unit
1500 Load information notification unit
1600 Data replacement unit

The invention claimed is:

1. An information processing system performing storage of data and analysis of the stored data in response to a request from an external apparatus, the information processing system comprising:
a plurality of data storage units each configured to provide a storage area of the data;
a plurality of data structure operation units each associated with the each data storage unit and configured to perform a predetermined operation on a data structure of the data stored in the data storage unit;
a plurality of data redundancy units each associated with the each data storage unit and configured to transmit any of the data stored in the data storage unit to the other data storage unit;
a data placement determination unit configured to determine in which of a plurality of the data storage units the data requested from the external apparatus is to be stored;
a data redundancy determination unit configured to cause a plurality of the data redundancy units to transmit any of the data to the other data storage unit;
a data structure operation determination unit configured to cause the each data structure operation unit to operate the data structure of the data stored in the data storage unit;
a data structure management information retaining unit configured to retain data structure management data that is information about the data to be stored in the plurality of the data storage units and the data structure of the data; and
an analysis processing unit configured to receive an analysis request on the data stored in the data storage unit from the external apparatus and perform analysis processing on the data according to the analysis request,
wherein the data placement determination unit acquires, on the data for which storage request has been received from the external apparatus, the number of pieces of data stored in the information processing system and the data structure of the data to be stored that are previously set, determines the data storage unit in which the data according to the storage request is to be stored, with reference to the data structure management information about corresponding data stored in the data structure management information retaining unit, and then notifies the external apparatus,
wherein the data redundancy determination unit instructs the data redundancy unit to create a replica of the data according to the storage request with reference to the data structure management information retaining unit and perform transmission of the created replica to the data storage unit that is a storage destination of the created replica,
wherein the data structure operation determination unit transmits to the data structure operation unit an instruction for performing a data operation on the data stored in any of the data storage units in which the replica is stored with reference to the data structure management information recorded in the data structure management information retaining unit, and
wherein the analysis processing unit performs the analysis processing based on either of the data after the data structure operation and the data of unoperated data structure, both of the data being stored in any of the data storage units depending on a content of the analysis request.

2. The information processing system according to claim 1, wherein the data structure operation determination unit causes any of a plurality of the data structure operation units to perform the data structure operation processing on the data according to the storage request based on the data structure management information about the data according to the storage request from the external apparatus, the data being recorded in the data structure management information retaining unit.

3. The information processing system according to claim 1, wherein the analysis execution location determination unit determines, on the data to be analyzed, to use the data having which of the data structure after the data operation and the data structure of the unoperated data structure, for the data structure, based on the content of the analysis request from the external apparatus, and, in accordance with the determination result, performs analysis processing on the data stored in any of the data storage units storing corresponding data after the data structure operation or data of the unoperated data structure with reference to the data structure management information retaining unit.

4. The information processing system according to claim 1, wherein the information processing system, when detecting that a failure has occurred in any of the data storage units, acquires data stored in the data storage unit in which the failure has occurred and a data structure thereof, with reference to the data structure management information stored in the data structure management information storage unit, and causes the data redundancy unit and the data structure operation unit associated with any of the data storage units, to recover the data stored in the data storage unit in which the failure has occurred, by using the data stored in any of the data storage units other than the data storage unit in which the failure has occurred.

5. The information processing system according to claim 1, further comprising:
a statistics information recording unit configured to record the number of references of the data to be analyzed for the each data structure, based on an analysis request received from the external apparatus; and a retention ratio change determination unit configured to give an instruction for changing the data retention ratio for each of the data structure after the data structure operation and the data structure of the unoperated data structure for the each data, wherein the data structure management information retaining unit further records the number of references and the retention ratio for the each data, and wherein the retention ratio change determination unit determines whether to change the retention ratio of the data structure of the each data, by using the retention ratio of the data stored in the each data storage unit for the each data structure and the number of references for the each data structure recorded by the statistics information recording unit, and when determining to change the retention ratio, determines a new retention ratio, and causes the data redundancy unit and the data structure operation unit to operate the data structure or recover the data structure after the operation.

6. The information processing system according to claim 5, further comprising:

a data structure change method determination unit configured to, when the data structure of the data stored in the data storage unit is changed, determine whether to operate the data structure of the data or acquire the data having the desired data structure stored in the other data storage units, and give an instruction to the data redundancy unit associated with the corresponding data storage unit;

load information notification units each associated with the each data storage unit and configured to notify the other data storage units of load information about the each data storage unit; and data replacement units each associated with the each data storage unit and configured to replace the data stored in the data storage unit with the data received from the other data storage units, wherein the retention ratio change determination unit determines whether to change the retention ratio of the data structure of the each data, by using the number of references for the each data structure of the data which is an analysis request target from the external apparatus recorded in the data structure management information retaining unit by the statistics information recording unit, and when determining to change the retention ratio, determine a new retention ratio based on the number of references, and then instruct the each load information notification unit to give notification of load information about the each data storage unit in order for the data structure change method determination unit to determine whether to perform operation of the data structure about the data, or creation of a replica of the data stored in any of the data storage units, and data replacement;

wherein the data structure change method determination unit determines whether to perform operation of the data structure or to cause the data redundancy unit and the data replacement unit to perform creation of a replica of the data, and data replacement, by using the received load information about the each data storage unit, and wherein the data replacement unit receives the data transmitted by the other data redundancy units and performs processing for replacing the data stored in the data storage unit with the received data.

7. The information processing system according to claim 1, wherein the data structure operation unit includes a data structure conversion unit configured to convert a conversion source file capable of invertible conversion defined according to a certain rule into a converted file to which conversion processing has been applied, and a data structure reverse-conversion unit configured to convert the converted file capable of invertible conversion defined according to the certain rule into the conversion source file to which reverse-conversion processing has been applied.

8. The information processing system according to claim 7, wherein the data structure is in a comma separated value format, the data structure conversion unit performs transposition processing for transposing a value of a row of the data and a value of a column thereof with each other, and the data structure reverse-conversion unit performs reverse-transposition processing for transposing the value of the row of the data and the value of the column thereof on which the transposition processing has been performed.

9. The information processing system according to claim 7, wherein the data structure conversion unit compresses the data using an appropriate algorithm and the data structure reverse-conversion unit recovers the compressed data using the algorithm.

10. A control method of an information processing system performing storage of data and analysis of the stored data in response to a request from an external apparatus, the information processing system including a plurality of data storage units each configured to provide a storage area of the data;

a plurality of data structure operation units each associated with the each data storage unit and configured to perform a predetermined operation on a data structure of the data stored in the data storage unit;

a plurality of data redundancy units each associated with the each data storage unit and configured to transmit any of the data stored in the data storage unit to the other data storage unit;

a data placement determination unit configured to determine in which of a plurality of the data storage units the data requested from the external apparatus is to be stored;

a data redundancy determination unit configured to cause a plurality of the data redundancy units to transmit any of the data to the other data storage unit;

a data structure operation determination unit configured to cause the each data structure operation unit to operate the data structure of the data stored in the data storage unit;

a data structure management information retaining unit configured to retain data structure management data that is information about the data to be stored in the plurality of the data storage units and the data structure of the data; and an analysis processing unit configured to receive an analysis request on the data stored in the data storage unit from the external apparatus and perform analysis processing on the data according to the analysis request, the control method comprising:

by the data placement determination unit, acquiring, on the data for which storage request has been received from the external apparatus, the number of pieces of data stored in the information processing system and the data structure of the data to be stored that are previously set, determining the data storage unit in which the data according to the storage request is to be stored, with reference to the data structure management information about corresponding data stored in the data structure management information retaining unit, and then notifying the external apparatus;

by the data redundancy determination unit, instructing the data redundancy unit to create a replica of the data according to the storage request with reference to the data structure management information retaining unit and perform transmission of the created replica to the data storage unit that is a storage destination of the created replica;

by the data structure operation determination unit, transmitting to the data structure operation unit an instruction for performing a data operation on the data stored in any of the data storage units in which the replica is stored with reference to the data structure management information recorded in the data structure management information retaining unit; and by the analysis processing unit, performing the analysis processing based on either of the data after the data structure operation and the data of unoperated data structure, both of the data being stored in any of the data storage units depending on a content of the analysis request.

11. The control method of the information processing system according to claim 10, further comprising, by the data structure operation determination unit, causing any of a plurality of the data structure operation units to perform the data structure operation processing on the data according to the storage request based on the data structure management information about the data according to the storage request from the external apparatus, the data being recorded in the data structure management information retaining unit.

12. The control method of the information processing system according to claim 10, further comprising, by the analysis execution location determination unit, determining, on the data to be analyzed, to use the data having which of the data structure after the data operation and the data structure of the unoperated data structure, for the data structure, based on the content of the analysis request from the external apparatus, and, in accordance with the determination result, performing analysis processing on the data stored in any of the data storage units storing corresponding data after the data structure operation or data of the unoperated data structure with reference to the data structure management information retaining unit.

13. The control method of the information processing system according to claim 10, wherein the information processing system, when detecting that a failure has occurred in any of the data storage units, acquires data stored in the data storage unit in which the failure has occurred and a data structure thereof, with reference to the data structure management information stored in the data structure management information storage unit, and causes the data redundancy unit and the data structure operation unit associated with any of the data storage units, to recover the data stored in the data storage unit in which the failure has occurred, by using the data stored in any of the data storage units other than the data storage unit in which the failure has occurred.

14. The control method of the information processing system according to claim 10, the information processing system further including a statistics information recording unit configured to record the number of references of the data to be analyzed for the each data structure, based on an analysis request received from the external apparatus, and a retention ratio change determination unit configured to give an instruction for changing the data retention ratio for each of the data structure after the data structure operation and the data structure of the unoperated data structure for the each data, the control method further comprising:

by the data structure management information retaining unit, further recording the number of references and the retention ratio for the each data; and by the retention ratio change determination unit, determining whether to change the retention ratio of the data structure of the each data, by using the retention ratio of the data stored in the each data storage unit for the each data structure and the number of references for the each data structure recorded by the statistics information recording unit, and when determining to change the retention ratio, determining a new retention ratio, and causing the data redundancy unit and the data structure operation unit to operate the data structure or recover the data structure after the operation.

15. The control method of the information processing system according to claim 14, the information processing system further including a data structure change method determination unit configured to, when the data structure of the data stored in the data storage unit is changed, determine whether to operate the data structure of the data or acquire the data having the desired data structure stored in the other data storage units, and give an instruction to the data redundancy unit associated with the corresponding data storage unit, load information notification units each associated with the each data storage unit and configured to notify the other data storage units of load information about the each data storage unit, and data replacement units each associated with the each data storage unit and configured to replace the data stored in the data storage unit with the data received from the other data storage units, the control method further comprising:

by the retention ratio change determination unit, determining whether to change the retention ratio of the data structure of the each data, by using the number of references for the each data structure of the data which is an analysis request target from the external apparatus recorded in the data structure management information retaining unit by the statistics information recording unit, and when determining to change the retention ratio, determining a new retention ratio based on the number of references, and then instructing the each load information notification unit to give notification of load information about the each data storage unit in order for the data structure change method determination unit to determine whether to perform operation of the data structure about the data, or creation of a replica of the data stored in any of the data storage units, and data replacement;

by the data structure change method determination unit, determining whether to perform operation of the data structure or to cause the data redundancy unit and the data replacement unit to perform creation of a replica of the data, and data replacement, by using the received load information about the each data storage unit; and by the data replacement unit, receiving the data transmitted by the other data redundancy units and performing processing for replacing the data stored in the data storage unit by the received data.

* * * * *